United States Patent
Greenberg et al.

(10) Patent No.: US 12,449,654 B2
(45) Date of Patent: Oct. 21, 2025

(54) EYE TRACKING SYSTEMS AND METHODS

(71) Applicant: EYEWAY VISION LTD., Or Yehuda (IL)

(72) Inventors: Boris Greenberg, Tel Aviv (IL); Abraham Rotnemer, Jerusalem (IL); Shoam Shwartz, Hod Hasharon (IL); Fares Marjieh, Jaffa-Nazareth (IL); Yaron Zimmerman, Kiryat Tivon (IL); Igor Tikhonenkov, Kiriat Mozkin (IL); Hanna Friedman, Givat Zeev (IL)

(73) Assignee: VOXELSENSORS SRL, Brussels (BE)

( * ) Notice: Subject to any disclaimer, the term of this patent is extended or adjusted under 35 U.S.C. 154(b) by 729 days.

(21) Appl. No.: 17/783,747

(22) PCT Filed: Dec. 6, 2020

(86) PCT No.: PCT/IL2020/051255
§ 371 (c)(1),
(2) Date: Jun. 9, 2022

(87) PCT Pub. No.: WO2021/117031
PCT Pub. Date: Jun. 17, 2021

(65) Prior Publication Data
US 2023/0039271 A1 Feb. 9, 2023

(30) Foreign Application Priority Data
Dec. 9, 2019 (IL) .......................... 271287

(51) Int. Cl.
*G02B 27/00* (2006.01)
*G06F 3/01* (2006.01)

(52) U.S. Cl.
CPC ......... *G02B 27/0093* (2013.01); *G06F 3/013* (2013.01)

(58) Field of Classification Search
None
See application file for complete search history.

(56) References Cited

U.S. PATENT DOCUMENTS 5,583,606 A * 12/1996 Shindo ............... G03B 7/00
                                                     396/51
10,698,481 B1 * 6/2020 Najafi Shoushtari .. G06V 20/20
(Continued)

FOREIGN PATENT DOCUMENTS

| CN | 107087431 A | 8/2017 |
| CN | 105431078 B | 11/2018 |
| TW | 201138715 A | 11/2011 |

OTHER PUBLICATIONS

International Search Report for corresponding application PCT/IL2020/051255 filed Dec. 6, 2020; Mail date Mar. 9, 2021.
(Continued)

*Primary Examiner* — Krishna P Neupane
(74) *Attorney, Agent, or Firm* — CANTOR COLBURN LLP

(57) ABSTRACT

Methods and systems for tracking an individual's eye, by tracking one or more ocular axes, are presented. The technique comprises the following: (i) illuminating the eye, over an area of the cornea extending over the pupil, with first and second incident light beams having a transverse cross sectional area smaller than a predetermined value with respect to an area of the pupil and propagating coaxially along a first optical path defined by central axes of the first and second incident light beams, wherein said first incident light beam is configured to be reflected from the cornea and said second incident light beam is configured to pass through the cornea and the pupil and to be reflected from a retina region of the eye; (ii) detecting respective first and second reflected light beams; (iii) adjusting the first optical path such that said first reflected light beam propagates along said first optical path (Continued)

and said second reflected light beam propagates along a second optical path having a predetermined spatial relationship with said first optical path whereby said predetermined spatial relationship is indicative of said ocular axis being along at least said first optical path; and (iv) tracking said ocular axis of the eye under changes in gaze direction of said eye by repeating (i) to (iii).

22 Claims, 8 Drawing Sheets

(56) References Cited

U.S. PATENT DOCUMENTS

| | | | |
|---|---|---|---|
| 2005/0007551 A1* | 1/2005 | Wakil | A61B 3/1015 |
| | | | 351/205 |
| 2006/0170868 A1 | 8/2006 | Molebny | |
| 2018/0032812 A1 | 2/2018 | Sengelaub | |
| 2018/0246336 A1* | 8/2018 | Greenberg | G02B 27/0176 |
| 2021/0191511 A1* | 6/2021 | Koo | G02B 27/0093 |

OTHER PUBLICATIONS

Written Opinion for corresponding application PCT/IL2020/051255 filed Dec. 6, 2020; Mail date Mar. 9, 2021.

* cited by examiner

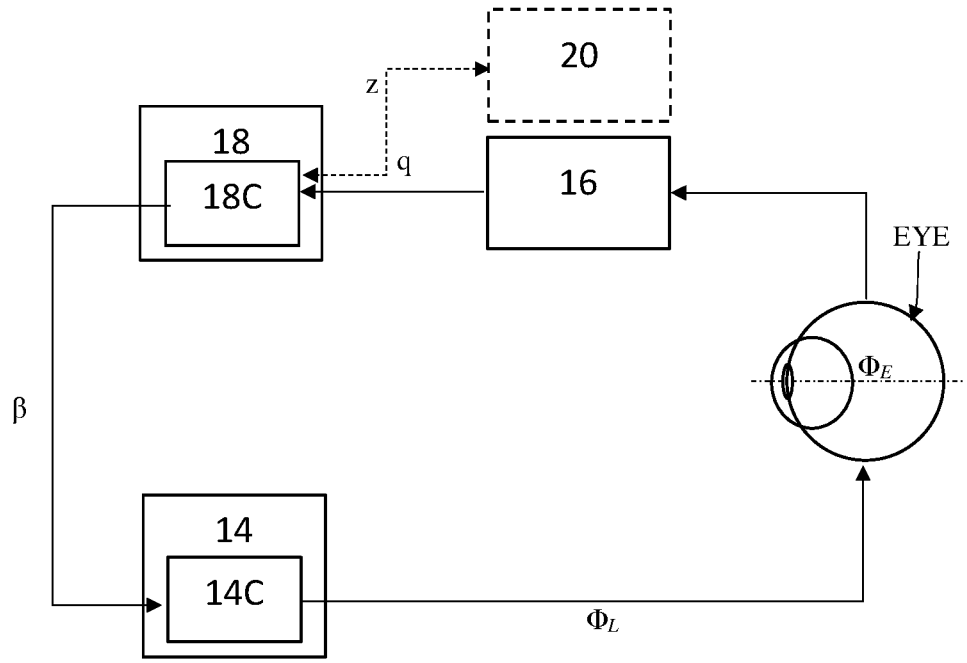
FIG. 6A
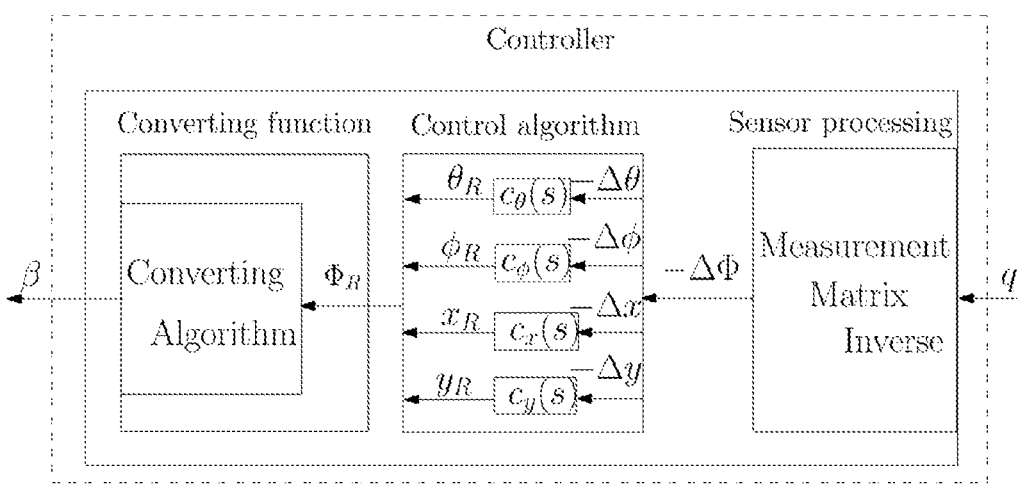
FIG. 6B1

FIG. 6B2

EYE TRACKING SYSTEMS AND METHODS

TECHNOLOGICAL FIELD

The invention is in the field of image projection systems, more specifically the invention relates to techniques for providing virtual and/or augmented reality experience to a user.

BACKGROUND

Wearable, e.g. head mounted, image projection systems for providing virtual and/or augmented virtual reality to the user eye(s) are becoming increasingly popular. Various systems are configured as glasses mountable onto a user's head and operable for projecting images to the user's eyes.

Some of the known systems are aimed at providing pure virtual reality image projections to the user eyes, in which light from the external real-world scenery is blocked from reaching the eye(s), while some other known systems are directed to provide augmented virtual reality perception, in which the light from the external real-world scenery is allowed to pass to the eyes while images/video frames projected to the eyes by the image projection systems are superposed on the external real-world scenery.

Providing image projections by the image projection systems should preferably emulate real life visionary perception. Light carrying the information of the outer world enters and traverses the human eye along known paths, until reaching the retina and from there the brain where the light signal is interpreted. Tracking the eye and gaze direction would therefore be necessary to provide convincing virtual and/or augmented virtual reality experience. Specifically, tracking the eye and gaze direction is very important in direct retinal projection. Typically, in this case, a small eye box is produced, typically with a size less than the pupil diameter. During natural eye movements, the image will be lost if the eye box is not expanded by optical means which add significant complexity to the virtual and augmented reality systems and often degrade image brightness and quality. Tracking the eye and gaze direction allows moving the eye box in real time thus enabling images with good brightness and contrast and eliminating the need for eye box expansion.

GENERAL DESCRIPTION

The present invention provides a novel approach of eye tracking for use, for example, in virtual and/or augmented virtual reality applications, and by this enabling projecting high-quality and life-like virtual images towards an eye of a user by preserving the location of the virtual images on the eye's retina with high accuracy.

Over the years, several ocular axes have been defined to form reference for defining the light paths inside the human eye, for use in multiple applications, such as in optometry, ophthalmological diagnosis and surgical procedures. Some of the frequently used ocular reference axes are the optical axis, the pupillary axis, the visual axis, and the line of sight. At least some of these ocular axes can be useful in virtual and/or augmented virtual reality applications and can serve as a reference for the image projection systems.

The optical axis of the eye can be defined as an axis that passes through and contains the centers of curvature of the optical surfaces of the eye. The optical surfaces of the eye are the anterior corneal surface, the posterior corneal surface, the anterior crystalline lens surface and the posterior crystalline lens surface. As the human eye is not a centered optical system, the optical axis is a theoretical construct, and a more practical definition of the optical axis may be the "best fit" line through the centers of curvature of the "best fit" spheres of cornea and lens surfaces.

The pupillary axis can be defined as the normal line to the anterior corneal surface that passes through the center of the entrance pupil. If the eye was a centered optical system, the pupillary axis would coincide with the optical axis. However, the pupil is often not centered relative to the cornea, the cornea is mostly deviating from a regular shape so that the pupillary axis points at a slightly different direction than the optical axis.

The visual axis can be defined as the line connecting the fixation point (e.g., the spatial location of the object being contemplated), with the fovea, passing through the two nodal points of the eye. Generally, in a typical adult human eye the angle between the optical axis and the visual axis is about 5° and varies between 4° and 8° approximately. When a target (fixation point) is in line with the fixation point and the fovea, that is, when the chief ray of the light is directed along the visual axis, the sharpest vision is realized. However, the visual axis is not easily found experimentally because the nodal points of the eye are abstract notions and are not physical entities within the eye. Since the nodal points (on object and image sides) are within 1 mm from the corneal center of curvature, the visual axis is nearly perpendicular to the cornea.

The line of sight can be defined as the ray from the fixation point reaching the fovea via the pupil center. The line of sight is basically the chief ray of the bundle of light arriving from an external object and reaching the individual's fovea. Unlike the visual axis, the line of sight can be easily identified experimentally thanks to its close connection to the pupil center. However, the line of sight may not be considered a fixed axis because the pupil center may move when the pupil size changes.

Another reference axis, which is used for centration during keratorefractive surgeries, is the coaxially sighted corneal light reflex (CSCLR) axis and is defined as the axis formed by connecting the subject-fixated coaxially sighted corneal light reflex with the fixation point, or in other words, it is the line connecting the fixation point to a point on the anterior corneal surface with its extension passing through the corneal center of curvature. By definition, the CSCLR axis is perpendicular to the anterior corneal surface and can be used as a marker of the visual axis with good approximation. It has been shown that centering refractive treatments on the CSCLR axis yields refractive and visual outcomes that are at times even better than the refractive outcomes of line-of-sight-centered treatments.

FIG. 1 illustrates an eye with its center of rotation (center of the sphere of the eye ball), corneal center of curvature (center of the cornea sphere), the visual axis, the line of sight, and the CSCLR with respect to a fixation target contemplated by the individual.

In the present invention, novel systems and methods for tracking the eye by tracking an ocular reference axis, e.g. the CSCLR axis (as a good approximation of the visual axis), and/or the optical axis, are presented. Tracking ocular axes, such as the visual axis (through the CSCLR axis) and/or the optical axis is significant, especially during implementation of virtual and augmented reality systems, and enables using either or both as reference for projecting high-quality and accurate virtual images towards the user's eye(s).

The eye tracking beam is incident on the cornea, passes through the pupil and is locked to a fixed position on the retina, thus allowing addressability to specific areas on the retina. A proof of stability of an eye tracker is a gaze contingent experiment in which the tracking light beam stays on the same position on the retina, causing the retina to become indifferent to the light beam.

The first optical surface of the eye that the light entering the eye encounters is the corneal surface, specifically the anterior corneal surface. Assuming, as a first approximation, that the cornea is a sphere, the center of curvature of the cornea is the center of the corneal sphere. It is also assumed, as a first approximation, that the CSCLR and optical axes are normal (perpendicular) to the anterior corneal surface since they pass through the center of curvature of the spherical cornea.

The retina of the eye is considered to be a diffusive retro-reflector, i.e. the light ray that reaches the retina with a specific direction is majorly reflected from the retina in the same direction. However, the light is scattered laterally in the various retinal layers so that a light ray that reaches the retina is reflected with a larger cross section that fills the whole area of the pupil. The eye pupil serves as the aperture of the spread cone of reflected light from the retina and, to a large extent, the memory of the incidence point of the incoming ray on the corneal surface is lost in the light reflected by the retina.

While it is assumed, with good approximation, that the whole eye is also a sphere, the visual axis does not pass through the center of the eye sphere (also called the center of rotation of the eye), and accordingly the chief ray of a light bundle that enters the eye along the visual axis, and is reflected from the fovea, does not propagate backwardly along the same path but along a parallel path because a) the chief ray does not pass through the center of rotation of the eye and as such it does not impinge perpendicularly on (being normal to) the retina at the inner sphere surface of the back of the eye, and b) the pupil is the limiting aperture of the diffusively reflected light from the retina, therefore it re-defines the chief ray of the backwardly propagating reflected light.

The reflectance of the retina is much higher with near infrared illumination (e.g. 850 nm and higher) than with short wavelength illumination, largely due to a decrease in absorption by melanin and blood. In the near infrared range, the incident light reaches deeper layers of the retina and therefore is scattered to a larger extent on its return path to the pupil.

The present invention utilizes the above-mentioned properties of the eye, including its shape and retina's characteristics, to track the eye, utilizing light beam propagation, by tracking one or more ocular axes, such as the CSCLR axis (as a good approximation for the visual axis) and/or the optical axis of the eye, with good approximation. According to the invention, a first light beam is used to utilize/fulfill a first condition relating to the cornea, and a second light beam is used to utilize/fulfill a second condition relating to the retina (and the fovea in particular, with good approximation). More specifically, for tracking the CSCLR axis (as an indicator for the visual axis) or optical axis, the first light beam is configured to track the cornea by following the perpendicularity (orthogonality) condition, and the second light beam is configured to pass through the cornea at a fixed intersection point, and to be retro-reflected from the retina.

In general, tracking of an ocular axis of the eye requires separating the monitoring of the position of the light beam from two spatially separated surfaces instead of one only, because human eye does not have a fixed center of rotation resulting in that angular eye motions involve also lateral displacement of the ocular axis. In order to track an axis in space, one needs to fix four degrees of freedom e.g. two angles (pitch and yaw) and two lateral displacements (horizontal/vertical). The first condition of perpendicularity to the cornea fixes two incidence angles (pitch and yaw) when fulfilled, and a second condition is needed that will ensure a constant (lateral, horizontal/vertical) intersection point of the axis on the cornea. Accordingly, a successful tracking of an ocular axis involves continuous adjustment of the spatial and angular propagation paths of the two tracking light beams, the corneal beam and the retinal beam, in order to maintain the tracking conditions, because, for example, the perpendicularity condition of the corneal beam will be breached with a lateral displacement of the cornea with respect to the corneal beam although the angular direction of the corneal beam should not be changed.

As mentioned above, according to the invention, the cornea is assumed to have a sphere shape. A light beam normal to the corneal surface will be reflected in the same direction, given that the reflection from the corneal surface is a specular reflection (this is mainly the case when the light beam falls on the cornea portion above the pupil). The light beam is reflected from the cornea along the same optical path if and only if it is normal (perpendicular) to the corneal surface. Additionally, the light that reaches the retina is diffusely reflected (nearly Lambertian reflection) from the point of incidence on the retina. In a first approximation, the highest reflected light intensity will be along the line connecting the point of incidence on the retina and the center of rotation of the eye. The light reflected from the retina fills the pupil of the eye so that the pupil is the limiting aperture for the light exiting the eye. Outside the eye, the light reflected from the retina will propagate backwardly in the opposite direction of the incident light beam, i.e. with the same angular orientation, due to the eye being a retroreflector, though having a wider cross section.

The technique of the invention for tracking ocular axes utilizes beam scanning, i.e. by suitably illuminating the eye with the first and second incident light beams propagating along well-defined spatial and angular illumination propagation path and detecting their respective reflected light beams propagating backwardly along one or more reflection propagation paths. A least the first incident light beam, configured to be reflected from the cornea, is a narrow beam, i.e. has a small cross-sectional dimension/area with respect to a dimension/area of the pupil. This enables obtaining spatial and angular information, i.e. information about the exact location of intersection point of the beam on the cornea as well as the angle of reflectance of the beam from the cornea. Moreover, the information of the spatial and angular propagation paths, both in the forward (illumination) and backward (reflection) directions, can be acquired by using relatively simple position sensors/detectors.

While imaging may be suggested as a technique for tracking the pupil of the eye, it would be practically impossible to track the eye with imaging when only a narrow beam is used to illuminate the cornea, because to be able to image the pupil, imaging based techniques need a wide beam, much wider than pupil area/diameter, in order to receive enough reflected light from eye tissue surrounding the pupil and to be able to perform image segmentation with the pupil clearly identified in the images. Besides, imaging techniques are associated with relatively intense computation and thus also with latency and energy consumption which is less suitable for portable, head-mounted retinal projection systems. On the other side, as will be further described below, imaging techniques of the pupil and possibly other features of the eye, such as the limbus, can be usefully combined with the scanning technique to provide even more robust eye tracking in some situations and arrangements. For example, due to its larger field of view (larger range of detectable gaze directions) and ability to provide distance data, imaging of the pupil and/or limbus can be utilized to enhance localization of the beam scanning and tracking system with respect to the tracked eye.

Thus, according to a first broad aspect of the invention, there is provided a method for tracking an ocular axis of an individual's eye, the method comprising:

(i) illuminating an eye of an individual, over an area of cornea of the eye extending over pupil of the eye, with first and second incident light beams each having a transverse cross sectional area smaller than a predetermined value with respect to an area of the pupil and propagating towards the eye coaxially along a first optical path defined by central axes of the first and second incident light beams, wherein said first incident light beam is configured to be reflected from the cornea and said second incident light beam is configured to pass through the cornea and the pupil and to be reflected from a retina region of the eye;

(ii) detecting respective first and second reflected light beams propagating backwardly from the eye;

(iii) adjusting the first optical path such that said first reflected light beam propagates backwardly from the eye along said first optical path and said second reflected light beam propagates backwardly from the eye along a second optical path having a predetermined spatial relationship with said first optical path whereby said predetermined spatial relationship is indicative of said ocular axis being along at least said first optical path; and (iv) tracking said ocular axis of the eye under changes in gaze direction of said eye by repeating (i) to (iii).

In some embodiments, the method is adapted for tracking a coaxially sighted corneal light reflex (CSCLR) axis of the eye, wherein said predetermined spatial relationship comprises said second optical path being parallel to and having a fixed spatial offset with respect to said first optical path. In some embodiments, the method further comprises carrying out a calibration stage for determining a value of said fixed spatial offset, wherein said calibration stage comprising determining said fixed spatial offset as an offset between said first and second optical paths, by carrying out the following under calibration conditions in which a gaze of the individual's eye is fixated on an object: carrying out steps (i) and (ii) with said first optical path, or an extension thereof, extending linearly and directly between said object and the eye of the individual.

In some embodiments, the method is adapted for tracking an optical axis of the eye, wherein said predetermined spatial relationship comprises said second optical path being coaxial with said first optical path such that central axes of the first and second reflected light beams coincide, the optical axis being an extension of said first optical path through the eye from the cornea to the retina.

In some embodiments, the first optical path is determined by illuminating the cornea with an incident light beam propagating along a first direction, detecting a reflected light beam being reflected from the cornea along a second direction, and determining the first optical path by adjusting said first or second direction until central axes of said incident light beam and reflected light beam coincide.

In some embodiments, each of said first and second incident light beams has a wavelength in an unseen range.

In some embodiments, each of said first and second incident light beams has a wavelength between 800 nm-1500 nm.

In some embodiments, said step of adjusting the first optical path includes at least one of horizontal, lateral and vertical adjustments of the first optical path with respect to the individual's eye.

In some embodiments, the method further comprises providing position data indicative of at least one of the following: horizontal distance between said first optical path and the individual's eye; lateral distance between said first optical path and the individual's eye; vertical distance between said first optical path and the individual's eye; angular range of gaze direction of the individual's eye; and utilizing the position data in said step of adjusting the first optical path. The position data may comprise image data of one or more of the following eye features: pupil, limbus, cornea and iris of the individual's eye. The image data may comprise stereo images of one or more of the eye features.

In some embodiments, adjusting the first optical path comprises applying a control function that calculates a correction signal, for use in said step of illuminating the eye of the individual, based on one or more of the following: said step of detection of the first and second reflected light beams, and said step of providing the position data. The correction signal may be calculated by utilizing a predetermined parametric space relating between a plurality of positions of light directing elements configured and operable to direct said first and second incident light beams and a corresponding plurality of said first optical path.

According to another broad aspect of the present invention, there is provided a system for tracking an ocular axis of an individual's eye, the system comprising:

a light source arrangement configured and operable to generate first and second incident light beams each having a transverse cross sectional area smaller than a predetermined value with respect to an area of the pupil, said first incident light beam being configured to be reflected from a cornea of an eye of the individual, said second incident light beam being configured to pass through the cornea and to be reflected from a retinal region of the eye;

a light directing arrangement configured and operable to:
direct said first and second incident light beams from said light source arrangement coaxially towards the eye of the individual along a first optical path defined by central axes of the first and second incident light beams to thereby illuminate the eye over an area of the cornea extending over pupil of the eye and to adjust said first optical path under changes in gaze direction of said eye, and
collect respective first and second reflected light beams propagating backwardly from the eye;

a light detection arrangement, located at an output of said light directing arrangement, and configured and operable for detecting said first and second reflected light beams and generating a detection output indicative thereof; and a control and processing utility being configured and operable to receive said detection output of said light detection arrangement and determine that the ocular axis of the individual is being tracked upon detecting that:
said first reflected light beam propagates along said first optical path, and
said second reflected light beam propagates along a second optical path defined by central axis of the second reflected light beam and having a predetermined spatial relationship with respect to said first optical path, whereby said predetermined spatial relationship is indicative of said ocular axis being along at least said first optical path.

In some embodiments, the system is adapted for tracking a coaxially sighted corneal light reflex (CSCLR) axis of the eye, wherein said predetermined spatial relationship comprises said second optical path being parallel to and having a fixed spatial offset with respect to said first optical path. The system may be adapted for carrying out a calibration stage for determining a value of said fixed spatial offset, wherein said calibration stage comprising determining said fixed spatial offset as an offset between said first and second optical paths under calibration conditions in which a gaze of the individual's eye is fixated on an object such that said first optical path, or an extension thereof, extends linearly and directly between said object and the eye of the individual.

In some embodiments, the system is adapted for tracking an optical axis of the eye, wherein said predetermined spatial relationship comprises said second optical path being coaxial with said first optical path such that central axes of the first and second reflected light beams coincide, the optical axis being an extension of said first optical path through the eye from the cornea to the retina.

In some embodiments, the source arrangement is configured and operable to generate said first and second incident light beams each having a wavelength in an unseen range.

In some embodiments, the source arrangement is configured and operable to generate said first and second incident light beams each having a wavelength between 800-1500 nm.

In some embodiments, one or more of said light source arrangement, light directing arrangement and light detection arrangement, or portions thereof, is(are) spatially displaceable in at least two dimensions, with respect to the individual's eye.

In some embodiments, the system further comprises a positioning utility configured and operable to provide position data indicative of at least one of the following: horizontal distance between one or more of said light source arrangement, light directing arrangement and light detection arrangement, or portions thereof, and the individual's eye; lateral distance between one or more of said arrangements and the individual's eye; vertical distance between one or more of said arrangements and the individual's eye; angular range of gaze directions of said individual's eye, thereby enabling optimizing location of one or more of said arrangements with respect to the individual's eye to enable tracking said ocular axis. The positioning utility may be configured as an imaging system configured and operable to provide image data of the individual's eye being indicative of said position data. The positioning utility may be configured as a stereo imaging system configured and operable to provide said image data of the individual's eye as a stereo image data being indicative of said position data. The image data may be indicative of one or more of the following features of the individual's eye: pupil, limbus, cornea and iris.

In some embodiments, the control and processing utility is configured and operable to utilize said detection output and/or said position data and, upon detecting that said ocular axis is not being tracked, calculate a correction signal to one or more of said light source arrangement, light directing arrangement and light detection arrangement, to adjust said first optical path. The control and processing utility may calculate the correction signal by utilizing a predetermined parametric space relating between a plurality of positions of said light source arrangement, light directing arrangement and light detection arrangement, and a corresponding plurality of said first optical path.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 6A-6D illustrate one non-limiting example of a control function/model configured to control the spatial and angular orientation/direction of the first optical path in any one of the methods and systems for tracking an ocular axis according to the present invention.

DETAILED DESCRIPTION OF EMBODIMENTS

In accordance with a first aspect of the invention, a method for tracking an ocular axis of an individual's eye is described. The method includes at least the following:

(i) illuminating an eye of an individual, over an area of cornea of the eye extending over pupil of the eye, with first and second incident light beams being narrow light beams with respect to a dimension of the pupil and propagating towards the eye coaxially along a first optical path defined by central axes of the first and second incident light beams, wherein said first incident light beam is configured to be reflected from the cornea and said second incident light beam is configured to pass through the cornea and the pupil and to be reflected from a retina region of the eye;

(ii) detecting respective first and second reflected light beams propagating backwardly from the eye;

(iii) adjusting the first optical path such that said first reflected light beam propagates backwardly from the eye along said first optical path and said second reflected light beam propagates backwardly from the eye along a second optical path having a predetermined spatial relationship with said first optical path whereby said predetermined spatial relationship is indicative of said ocular axis being along at least said first optical path; and (iv) tracking said ocular axis of the eye under changes in gaze direction of said eye by repeating (i) to (iii).

As will be described further below, the tracked ocular axis can be, in one example, the CSCLR axis (which is a very good approximation of the visual axis). In another example, the tracked ocular axis can be the optical axis. However, it should be noted that, while not specifically exemplified, other ocular axes having known optical paths with respect to the eye can be tracked using the technique of the invention.

Figure 2:
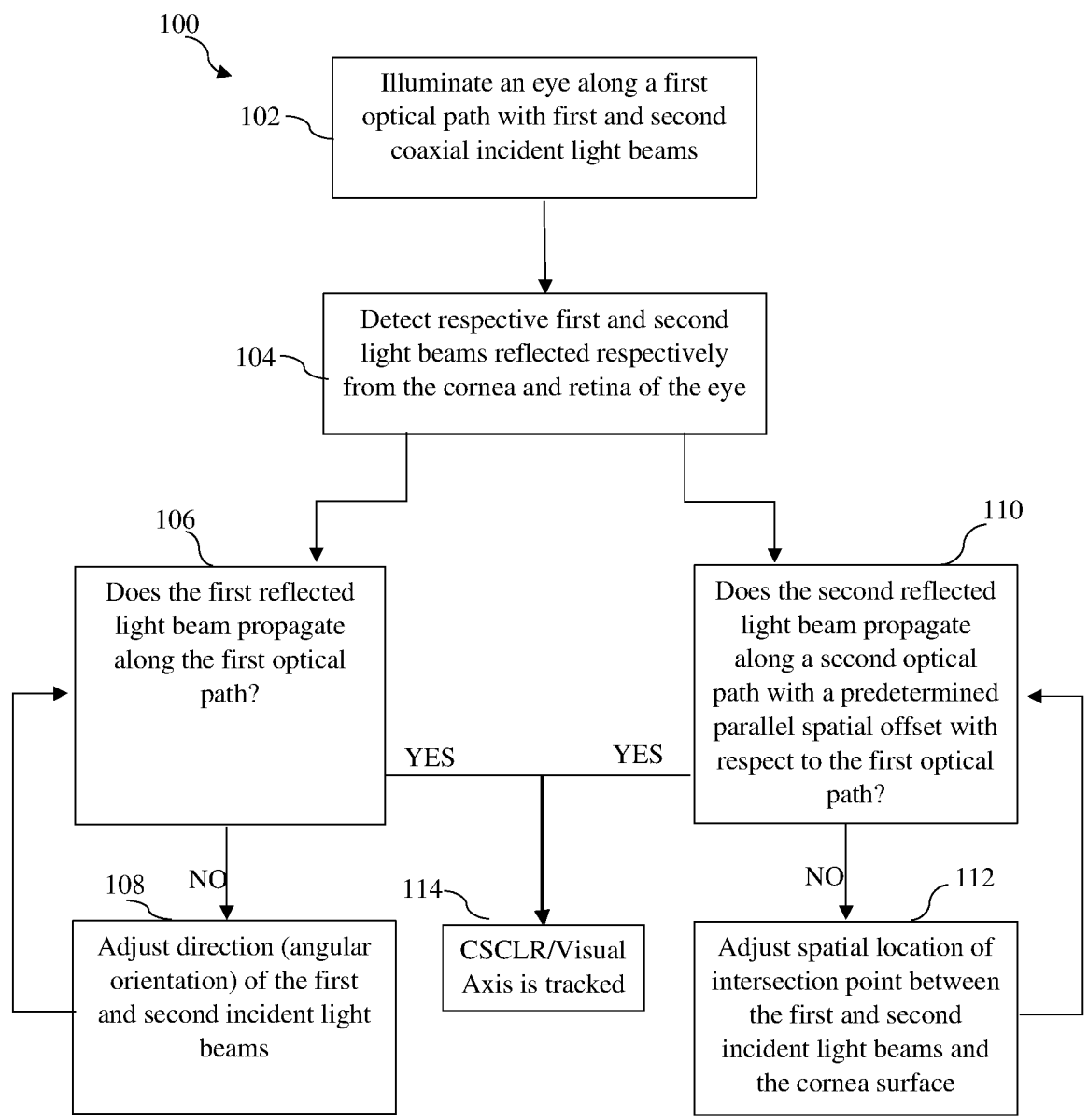
FIG. 2 illustrates by way of a flow diagram a non-limiting example of a method for tracking a CSCLR/visual axis of an individual's eye, in accordance with exemplary embodiments of the present invention.

Reference is made to FIG. 2 illustrating by way of a flow diagram a non-limiting example of a method 100 for tracking a CSCLR axis (indicating the visual axis) of an individual, in accordance with the above-described method and according to some exemplary embodiments of the present invention. The method 100 utilizes the principles of one aspect of the invention in which two light beams are fired towards the individual's eye in order to find the CSCLR/visual axis. It is assumed that each eye of the two eyes has its own CSCLR/visual axis, because the light reaching each eye, when a person looks at an external object, passes through a different path in the space. Therefore, the method 100 is typically applied per each eye of the individual such that two specific ocular axes corresponding to each of his/her eyes are determined for each individual.

In step 102, the individual's eye is illuminated with first and second incident light beams propagating towards the eye coaxially along a first mutual optical path. It is noted that the two light beams are coaxial, meaning that they share the same optical path for their central axes (defined as the center of the light beam's transverse cross section), or in some other examples their chief rays. The coaxial condition of the two light beams is at least realized when the light beams arrive at the cornea surface, e.g. for a predetermined distance of the first optical path just before the light beams encounter the cornea surface. The two light beams are not necessarily identical and can be different with respect to their transverse cross section's area and/or shape, and can be of different optical properties such as their wavelengths, frequencies, intensities, etc. For simplicity, it is noted that whenever the beam cross section is mentioned, the intention is to the transverse cross section unless stated otherwise.

The first incident light beam is configured to be reflected from the cornea of the eye, and accordingly it is sometimes referred to herein as a "corneal beam" or "corneal tracker". The CSCLR axis defines a light path that enters the eye by intersecting the cornea at a point coinciding, or almost coinciding, with the corneal intersection point of the visual axis and then propagates inside the eye and reaches the retina and specifically the fovea. Utilizing the fact that nodal points of the eye are nearly coincident with the center of cornea, the visual axis is nearly perpendicular to the cornea surface (assuming that the cornea has a spherical shape), therefore the CSCLR axis, which is perpendicular to the cornea surface by definition, is close enough approximation of the visual axis. The first incident light beam is configured to track the incidence angle of the light beam with respect to the eye's optical axis and to maintain the condition of perpendicularity of the CSCLR axis with respect to the corneal surface. As such, the first incident light beam is configured to be normal to the corneal surface at all directions of an individual's gaze, all the time. Fulfilling the condition of perpendicularity between the first incident light beam and the cornea is applied, as a result, for the second incident light beam due to the coaxial condition between the first and second incident light beams. Accordingly, the first and second light beams are configured to meet the corneal surface with a right angle at each meeting point or intersection point (the point on the corneal surface where the first and second light beams fall). The perpendicularity condition is verified by the detection of a reflection of the first incident light beam, the corneal beam, from the cornea. As such, the optical properties of the first light beam are selected such that it is reflected in a measurable amount from the cornea. More details about the optical properties of the first as well as the second light beams are described herein further below.

The second incident light beam is configured to pass through the cornea and the pupil and to be reflected from a retina region of the eye, and accordingly it is sometimes referred to herein as a "retinal beam". As such, the optical properties of the second light beam should at least be selected to enable the second light beam, or at least a major portion thereof, to traverse the cornea and the internal regions of the eye, and to be reflected from the retina in major/measurable amount. Being a retro reflector, the retina reflects the second light beam in the same general direction, though possibly spatially shifted, while maintaining the same angle with respect to a general direction in the space, for example an imaginary horizontal direction. When reflected from the retina, the second light beam may scatter inside the eye such that the general cross section of the light beam is enlarged with respect to its overall area. Typically, the second light beam reflected backwardly from the retina fills the whole pupil and exits the eye while having a cross section larger than the cross section of the second incident light beam.

In step 104, first and second reflected light beams being respectively the reflections of the first incident light beam (from the cornea) and the second incident light beam (from the retina) are detected.

As will be described below, each of the reflected light beams should independently meet respective conditions and requirements, and those conditions are examined independently for each reflected beam. Only when both reflected light beams meet their respective conditions independently, the CSCLR axis, and accordingly the visual axis, is assumed to be tracked. The conditions for both reflected beams can be defined through a control function, as will be further described below.

In step 106, the perpendicularity (normality) to cornea condition is verified through the analysis of the detected first reflected light beam. It is noted again that the second incident light beam, being coaxial with the first incident beam, should also be perpendicular to the cornea. When the first (and second) light beam impinges on the cornea surface with a right (90°) angle (with respect to a tangent to the cornea surface at the intersection point), it is reflected therefrom also with a right angle, i.e. along the same optical path but in the opposite direction. Accordingly, the perpendicularity condition can be verified if and when the first reflected light beam (being the reflected portion of the incident light beam) propagates backwardly, away from the eye, along the path that was traversed by the first (and second) incident light beam, i.e. along the first optical path. If it is detected that the first reflected light beam is not propagating along the first optical path in the backward direction, i.e. it is propagating along a different path, then the angular direction of the first optical path, along which both of the first and second light beams propagate, should be modified and adjusted.

It is noted that according to some embodiments, the method of tracking the CSCLR/visual or optical axis can include preliminary steps for defining an individual-specific parametric space of all optical paths being perpendicular to the cornea surface over a predetermined area thereof extending at least over the pupil and within a predefined range of angular and lateral positions of the eye, by utilizing the properties of the first incident and reflected light beams only. While method 100 should be executed continuously because eye movements (angular as well as spatial/lateral) cause the incident beams not to be perpendicular to the cornea, prior knowledge of the parametric space of all optical paths being perpendicular to the cornea surface can greatly reduce the latency of the tracking and increase its accuracy. In other words, a preliminary method for finding all optical paths perpendicular to the cornea surface over an area thereof and with a predefined range of angles and lateral positions with respect to a fixed axis in space, can be applied by scanning the cornea with a plurality of incident light beams. The defined perpendicular-to-cornea optical paths define respective intersection points where the light beams hit the cornea surface. The distance between every two optical paths or intersection points can be as small as possible to obtain highly accurate tracking of the CSCLR/visual or optical axis. In one example, the preliminary method finds a) the required settings of light deflectors to affect particular light beam angles with respect to a nominal optical axis of the system used, b) the translation between the recorded shift of the light beam from perfect backward direction (i.e. non perpendicular incidence) to the required angular and lateral corrections needed to bring the light beam back to perpendicular incidence. More on this is described further below.

In step 108, after detecting that the first reflected light beam does not propagate in the opposite direction of the first optical path, the direction of the first optical path is corrected and adjusted, i.e. the first and second light beams, or at least the first incident light beam (if the first and second light beams are not projected simultaneously towards the individual's eye), is/are directed in another angular direction to be perpendicular to the cornea at the intersection point by identifying and detecting that the first reflected light beam is propagating along the adjusted first optical path in the backward direction, away from the eye. After step 108, step 106 is repeated to verify whether the perpendicularity condition is satisfied, after which the next step is executed. When the perpendicularity is achieved, the corneal condition is met and the first optical path is locked. However, only when the retinal condition, i.e. the condition relating to the second reflected light beam, as will be described below, is also met, then it is determined that the ocular axis, in this case the CSCLR/visual axis, is tracked.

In step 110, simultaneously and/or independently with respect to steps 106 and 108, the detected second reflected light beam is analyzed to verify whether a retinal/foveal condition, being a second condition for tracking the CSCLR/visual axis, is satisfied.

According to the retinal condition, the spatial location (three dimensional) of the second reflected light beam relative to the first and/or second incident light beam(s), i.e. relative to the first optical path, is examined. A predetermined parallel spatial offset (i.e. with defined value(s), such as distance and/or angular value(s)) of the second reflected light beam with respect to the first optical path (the path along which the first and second light beams when being perpendicular to the cornea propagate) is indicative of that the second reflected light beam is being reflected from a specific region on the retina, specifically the fovea. The spatial offset between the parallel optical paths of the second and first reflected light beams is basically two-dimensional, i.e. it can be defined as a spatial offset within a plane tangent to the cornea surface at the intersection point where the first optical path (the path of the first reflected light beam) meets the cornea surface and in other words it can be called the reflection point as well. Within the tangent plane described, the spatial offset of the optical path of the second reflected light beam from the first optical path can be in any direction around the first optical path, i.e. can be on a perimeter of a circle surrounding the first optical path with the latter being at the center of the circle. However, only one point on the perimeter of the circle defines the path of the second reflected light beam that is indicative of the CSCLR/visual axis being along the first optical path (of the incident first and second coaxial light beams). The predetermined spatial offset can be defined in various ways as will be described herein further below. In one example, the spatial offset can be defined as a vector in space, specifically a vector laid out on the tangent plane. If the retinal condition is not satisfied, then the first optical path should be adjusted. As appreciated, adjustment of the first optical path means both angular and spatial/lateral adjustments, because of the spherical shape of the cornea. In other words, adjusting the lateral location of the first optical path (moving the intersection point) will definitely result in that the light beams are no longer perpendicular to the cornea and therefore both the angular and lateral adjustments are required.

In step 112, in order to satisfy the retinal/foveal condition, the intersection point between the first and second incident light beams and the cornea is adjusted by moving the first and second incident light beams. Then, step 110 is examined again to check whether the retinal/foveal condition is fulfilled at which point the retinal/foveal condition is locked. Only when both the perpendicularity and foveal conditions are satisfied, the CSCLR/visual axis is tracked. The CSCLR/visual axis will be partially coincident with the optical path of the second (and first) incident light beam, i.e. partially coincident with the first optical path at the portion located out of the eye.

It is understood that, given the spherical shape assumption of the corneal surface, whenever the step 112 is executed, steps 106 and 108 are also executed simultaneously to achieve the perpendicularity condition, because every change in the intersection point translates to a violation of the perpendicularity condition.

Back to step 110, the condition relating to the predetermined spatial offset between the optical path of the first reflected light beam, being the first optical path along which the first and second incident light beams propagate towards the eye, and the parallel optical path of the second reflected light beam, can be determined based, for example, on the following details. It should, however, be noted that the determination of the spatial offset does not form part of the step 110 or the method 100 and it can be determined independently beforehand and only used during step 110.

A non-limiting example for determining the spatial offset is by momentarily fixating gaze of the individual towards an object during the illuminating with the first and second incident light beams and the detecting of the respective first and second reflected light beams, such that the first optical path or an extension thereof extends linearly and directly between the object and the eye of the individual. Fixating of the individual's gaze on an object means that the path of the CSCLR/visual axis is spatially known. If the first incident light beam is normal to the cornea surface and the second incident light beam is coaxial with respect to the first incident light beam, then the spatial offset measured/detected is the spatial offset indicative of the CSCLR/visual axis. This spatial offset, as appreciated, is constant and can be used to track the CSCLR/visual axis of the individual.

It is appreciated that since the cornea surface is assumed to be spherical, then a plurality of perpendicular-to-cornea optical paths are different and distinct, such that for each intersection point on the cornea surface (the point where the perpendicular optical path meets the surface of the cornea), the optical path has a distinct three dimensional spatial and angular orientation. A parametric space of the optical paths specifications (three dimensional spatial location and angular orientation) for the respective intersection points on the cornea surface can be obtained and saved to be utilized for defining the first optical path along which the first and second incident light beams propagate when tracking the CSCLR/visual axis of the individual according to the invention. Details about the control function that include, inter alia, recognition/definition of a parametric space of the optical paths perpendicular to the cornea will be described further below.

Figure 3:
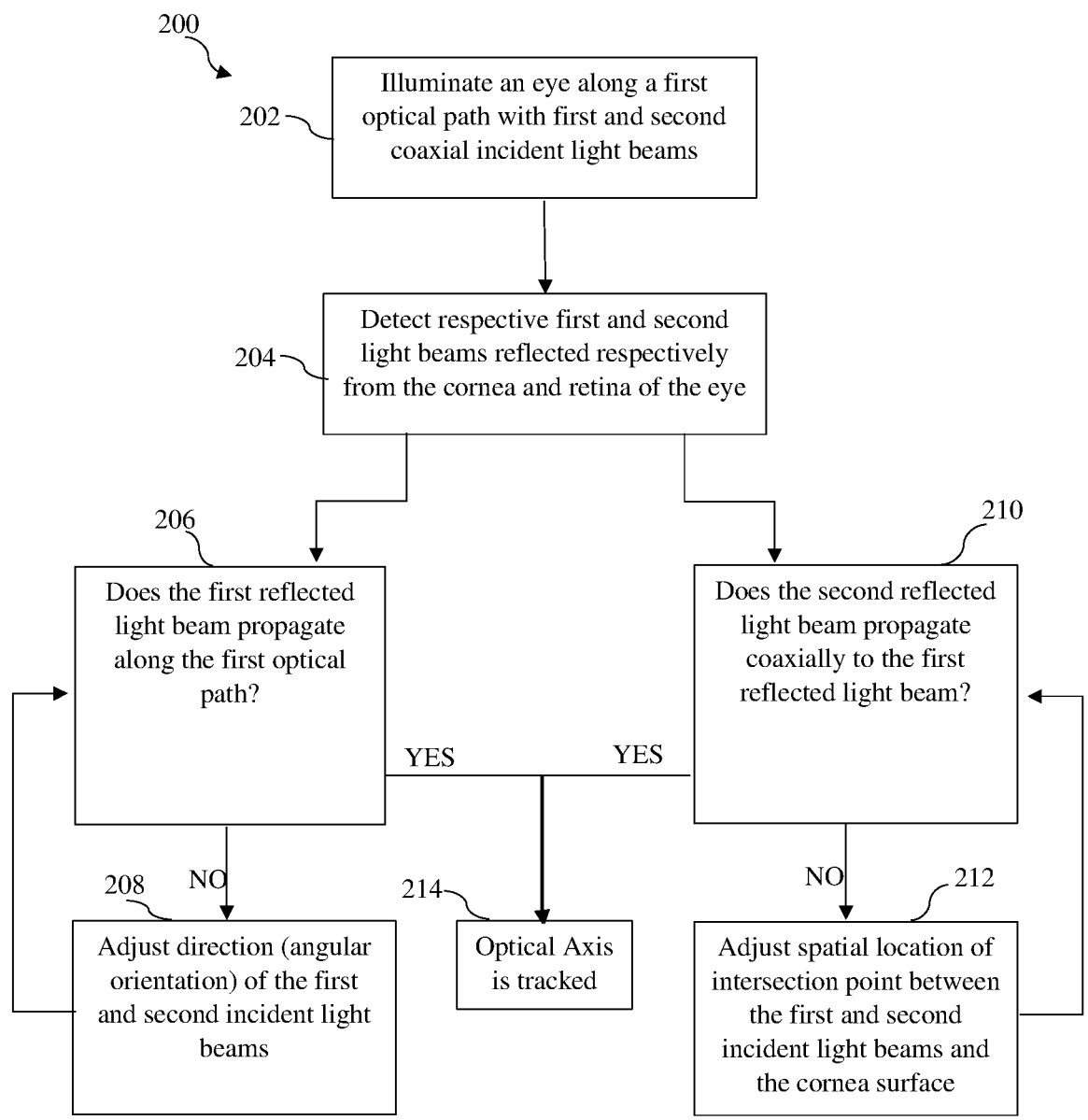
FIG. 3 illustrates by way of a flow diagram a non-limiting example of a method for tracking an optical axis of an individual's eye, in accordance with exemplary embodiments of the present invention.

Reference is made to FIG. 3 illustrating by way of a flow diagram a non-limiting example of a method 200 for tracking optical axis of an individual's eye according to some non-limiting embodiments of the present invention.

As mentioned above, by definition, the optical axis passes through the center of curvature of the optical surfaces of the eye. The first optical surface of the eye that the light encounters is the corneal surface, specifically the anterior corneal surface. As the cornea is assumed to form a sphere, the center of curvature of the cornea is the center of the corneal sphere. Accordingly, passing through the center of the corneal sphere means that the optical axis is normal to the anterior corneal surface. In addition, as the eye is assumed to form a sphere, the optical axis passes through the center of curvature of the eye, i.e. the center of the eye sphere, which is also called the center of rotation.

In step 202, the individual's eye is illuminated with first and second incident light beams (corneal and retinal beams respectively) propagating towards the eye coaxially along a mutual first optical path. The light beams specifications can be similar to the described above with reference to FIG. 1. The illumination is done over an area of cornea of the eye extending over pupil of the eye.

In step 204, respective first and second reflected light beams propagating backwardly from the eye, respectively from the cornea and the retina, are detected.

In steps 206 and 208, the perpendicularity condition between the first and second light beams and the cornea surface is examined, by analyzing the propagation of the first reflected light beam, similarly to what is described above with reference to FIG. 1. Again, it is noted that each of the reflected light beams should independently meet respective conditions and requirements, and those conditions can be examined simultaneously for each reflected beam in order to efficiently track the optical axis. Only when both reflected light beams meet their respective conditions independently, the optical axis is assumed to be tracked. The conditions for both reflected beams can be defined through a control function, as will be further described below.

In step 210, simultaneously with and independently from testing the perpendicularity condition, the propagation of the second reflected light beam is analyzed. If the second reflected light beam propagates backwardly coaxially to the first reflected light beam, i.e. along the mutual optical path, then the optical axis is tracked (step 214), otherwise, the spatial location of the incident first and second light beams (i.e. the intersection point between the light beams and the cornea surface) is adjusted, while the perpendicularity to the cornea surface is maintained by repeating steps 206 and 208, and then step 210 is repeated.

The optical axis of the eye will be an extension of the mutual optical path through the eye from the cornea to the retina, passing through the center of rotation.

Again, it is noted that, as a result of the spherical surface of the cornea, the perpendicularity to cornea condition is breached whenever the optical path is moved laterally, thus requiring angular correction of the optical path. For efficiently tracking any ocular axis of the eye, a control function that defines the relationship between the lateral (spatial) and angular corrections of the optical paths along which the incident light beams propagate can be defined and utilized.

The incident light beams used in the technique(s) of the invention can have one or more wavelengths all being in an unseen wavelength range, such that illumination of the light beams towards the individual's eye does not disturb, dazzle or distract the individual. This is particularly important in virtual and/or augmented reality applications, in which virtual images (objects and scenes) are continuously projected towards the individual's eyes while continuous track of one or more ocular axes is required in order to control the specifications of the projected image. For example, in augmented reality applications, the individual is exposed to both real scenery and virtual scenery superposed thereof, in which case it is essential to avoid interruption with the individual's vision during the activity. At the same time, it is important for the first incident light beam to have a wavelength that causes a measurable part of the beam to be reflected from the cornea, whereas the second incident light beam should have a wavelength that causes at least the major part of the beam to pass through the cornea and to be majorly reflected from the retina.

Accordingly, the incident light beams can be in any un-harmful and un-disturbing light range that fulfils the above two conditions. In some non-limiting embodiments, the incident light beams can be in the Infrared (IR) range. In some specific non-limiting embodiments, the first and second incident light beams can have a wavelength in the range between 800 nm-1500 nm.

In some embodiments, differentiating between the first and second incident as well as reflected light beams can be assisted by using different wavelengths for the first and second light beams.

As mentioned above, to track the eye with the scanning beams, there is a condition that the second light beam enters the eye through the pupil of the eye. This condition is met by spatially localizing the light beams' origin(s) and/or path with respect to the tracked eye. Also, the first light beam (configured to be reflected from the cornea) may have a limited angular distribution of the propagation path due to physical limitations of the light beam path(s) between the light beams' origin(s) and the eye, and physical limitations of the light beams' path(s) from the eye to the light beam detector(s). For example, in a specific optical arrangement, the range of gaze directions tracked may be a cone of 20 degrees (±10 degrees) around the optical/visual axis and ±1 mm lateral shift of the eye. Therefore, the localization of the light beams' origin(s) and/or path with respect to the tracked eye is significant. Also important is the localization of the light beams' detector(s) with respect to the tracked eye.

For example, in augmented reality (AR) applications, this localization/positioning step is required in one or more scenarios, such as:

1. It is possible that during initial placement of the glasses on the user's head the light beams may miss the eye (e.g., the chief ray of projected image is blocked, but part of peripheral image may still enter the pupil). In this case, localizing the light beams' origin(s) and detector(s), by adjusting/fine tuning the placement of glasses, in order to obtain the full range of gaze tracking, is required.

2. Whenever tracking of user's gaze direction is lost (e.g. when lateral offset of the eye is such that the angular range of the light beams propagation path becomes practically zero) while there are still detectable signals of beam reflection (from cornea and/or retina), the localization step can provide the necessary spatial corrections of the light beams origin(s) and/or detector(s) to effectively ensure the required range of eye gaze tracking.

Therefore, a localization/positioning step of at least one of the light beams' origin(s), light beams' detector(s) and light beams' path(s) towards and from the tracked eye can be added to the methods 100 and 200 above. The localization step (while not explicitly shown) may be a preliminary step performed before executing the steps of methods 100 and 200, and/or may be performed simultaneously to the steps of methods 100 and 200, for example at a predetermined frequency/pace, to ensure the continuous fulfillment of the localization condition.

The spatial localization of the light beams' origin(s) and/or detector(s) and/or path(s) with respect to the tracked eye includes at least one of distance (from the eye), angular orientation and lateral displacement.

Figure 4:
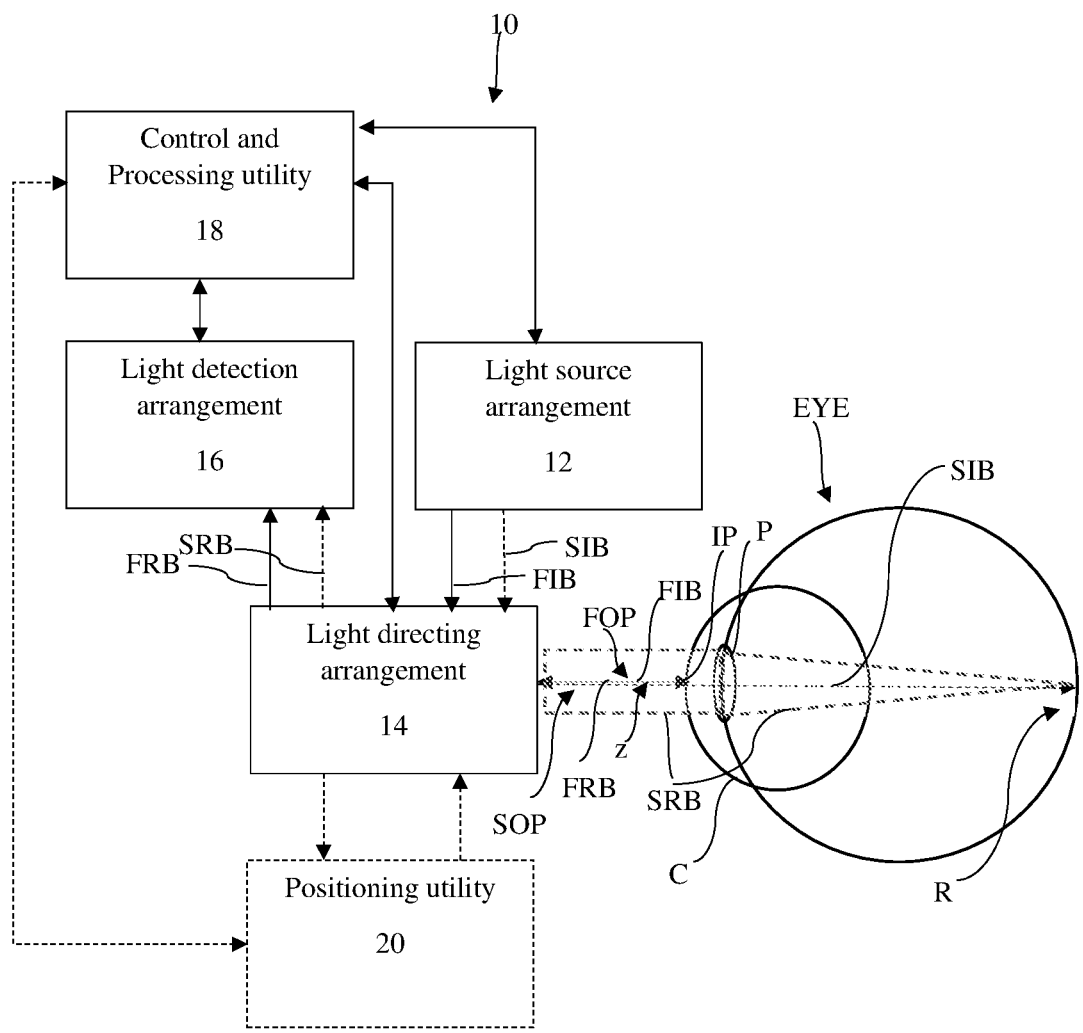
FIG. 4 illustrates by way of a block diagram a non-limiting example of a system for tracking an ocular axis of an individual's eye, in accordance with exemplary embodiments of the present invention.

In some embodiments, the spatial localization of the light beams' origin(s) and/or detector(s) and/or path(s), with respect to the tracked eye, is achieved by providing imaging data of the eye, specifically of the pupil and/or limbus of the eye. In some embodiments, the imaging data may include stereo imaging data. In some embodiments, the imaging data is LiDAR-based or the like. In particular, techniques and/or methods and/or systems for imaging the pupil and/or limbus are described in WO20157746, assigned to the assignee of the present invention. The range of gaze directions achievable by the imaging may be at least a cone of 40 degrees (±20 degrees) which is bigger than the one achievable by specific configurations of the scanning light beams, thereby enabling displacing the light beams' origin(s) and/or detector(s) and/or path(s), with respect to the tracked eye, to guarantee the eye tracking by the scanning beams. Reference is now made to FIG. 4 illustrating by way of a block diagram a non-limiting example of a system 10 for tracking a CSCLR/visual axis and/or an optical axis of an individual's eye EYE, according to some exemplary embodiments of the technique of the present invention. The system 10 can be used in execution of methods 100 and 200 described above. Accordingly, the system 10 is configured and operable to generate and direct a corneal beam and a retinal beam towards the individual's eye, specifically towards an area of the cornea surface covering the pupil of the eye, and to detect the two respective reflected beams and analyze the detected beams in order to determine and track the path of the visual axis and/or optical axis.

As shown, the system 10 includes utilities/sub-systems such as a light source arrangement 12, a light direction arrangement 14, a light detection arrangement 16 and a control and processing utility 18, configured and operable together to determine and track the CSCLR/visual axis and/or optical axis of the eye EYE. For clarity, it is noted that the word arrangement can mean a whole sub-system of the system 10, where each sub-system can be an independent system or integrated within the system 10. In some embodiments, the system 10 further includes a positioning/localizing utility/sub-system 20 configured to optimize and enhance the positioning of the light source arrangement 12, the light detection arrangement 16 and/or the light directing arrangement 14 with respect to the eye EYE.

The light source arrangement 12 is configured and operable to generate first and second incident light beams FIB and SIB to be projected towards the eye EYE. The light source arrangement 12 is configured to generate the first incident light beam FIB being configured to be reflected from the cornea C of the eye, and to generate the second incident light beam SIB being configured to pass through the cornea C and to be reflected from a retinal region R of the eye.

The light source arrangement 12 can include one or more light source units configured to generate the first and second light beams FIB and SIB. In some exemplary embodiments, one or more source units are configured to generate the first incident light beam FIB and other one or more source units are configured to generate the second incident light beam SIB. In some exemplary embodiments, one or more light source units are configured to generate both of the first and second incident light beams FIB and SIB. In some exemplary embodiments, the light source arrangement 12 is configured to generate the first and second incident light beams FIB and SIB concurrently and/or simultaneously. In some exemplary embodiments, the light source arrangement 12 is configured to generate the first and second incident light beams FIB and SIB sequentially. In some exemplary embodiments, specifically when one or more light source units are configured to generate both of the first and second incident light beams FIB and SIB, a filter can be used at the output of the one or more light source units if the first and second incident light beams FIB and SIB are of different wavelengths.

In some exemplary preferred embodiments, the light source arrangement 12 is configured and operable to generate the first and second incident light beams FIB and SIB having wavelengths in the unseen range, to minimize disturbance to the individual, as described above. For example, the light beams can be in the infrared range, e.g. in the range between 800 nm-1500 nm. The first and second incident light beams FIB and SIB can have different wavelengths to facilitate the separation of their contribution during the detection stage.

Other specifications of the first and second incident light beams FIB and SIB are described above with reference to methods 100 and 200, and are equally valid for the system 10.

The light directing arrangement 14 is configured and operable to receive the first and second incident light beams FIB and SIB from the light source arrangement 12 and direct them coaxially towards the eye EYE along a first optical path FOP defined by central axes of the first and second incident light beams FIB and SIB to thereby illuminate the eye over an area of the cornea C extending over the pupil P of the eye EYE. Additionally, the light directing arrangement 14 is configured and operable to collect respective first and second reflected light beams FRB and SRB propagating backwardly from the eye EYE, where FRB is reflected from the cornea C and SRB is reflected from the retina R through the pupil P. It is noted that, as illustrated in the figure and as described above, the retina is a retro-reflector that reflects light in the same direction of the light impinged on it, however with scattering that causes the reflected light beam SRB to expand in cross section covering the whole pupil P on the way out.

The light directing arrangement 14 is configured to receive the first and second incident light beams FIB and SIB at the input, where FIB and SIB need not necessarily be collinear/coaxial at the input to the light directing arrangement 14, and to output the first and second incident light beams FIB and SIB such that they are collinear/coaxial at the output and such that FIB and SIB propagate along a mutual first optical path FOP until reaching the cornea surface while being coaxial and while their central axes hit the cornea surface at the same intersection point IP, as was described above with reference to methods 100 and 200.

The light directing arrangement 14 can include optical elements responsible for adjusting the optical path of the light beams, such as optical reflectors, optical deflectors, mirrors, dichroic mirrors, beam splitters, lenses, and other similar elements configured and operable to direct the incident light beams as well as the reflected light beams in accordance with the conditions mentioned above.

The light directing arrangement 14 is responsible for directing the first and second incident light beams FIB and SIB coaxially along the first optical path FOP and such that FIB and SIB are perpendicular to the cornea C at the intersection point IP.

The light directing arrangement 14, through its various optical path adjustment elements is configured and operable to compensate for any angular or lateral displacements of the eye during the tracking of the relevant ocular axis, such that it guarantees that the conditions required, such as the perpendicularity to cornea condition, are fulfilled.

For a proper functioning of the eye tracking, the system should be capable to provide the required incidence angles, be capable to detect the deviations of the light beams from perfect backward direction and to affect the necessary correction(s) in order to achieve perpendicular to cornea incidence and to achieve correct incidence of the second (retinal) beam.

Nevertheless, in some situations, due to physical limitations, the light directing arrangement 14 may be limited and cannot compensate for the angular or lateral displacements of the eye. The angular and lateral ranges that can be applied may be limited by several factors: the angular ranges of the respective mirrors controlling the optical paths of the light beams, the diameters of the mirrors and of the respective sensors that are detecting the reflected beams. The angular and lateral ranges are governed by a well-known optical invariant, the Lagrange Invariant, stating that in any optical system comprising only lenses/mirrors, the product of the image size/mirror diameter and ray angle is a constant, or invariant, of the system. Therefore, once the optical components of the light directing arrangement are chosen, the angular and lateral ranges of the eye tracking system will be fixed. In such case, it is required to spatially displace one or more of the light source arrangement 12, the light direction arrangement 14, the light detection arrangement 16, or parts thereof, with respect to the tracked eye. Therefore, at least one of the light source arrangement 12, the light direction arrangement 14, and the light detection arrangement 16 is mounted in front of the eye on one or more support structures that enable at least two, and specifically three, dimensional spatial movement and displacement of the arrangement(s), or portions thereof (such as one mirror or reflector), with respect to the eye.

The light detection arrangement 16 is located at the output of the light directing arrangement 14, and is configured and operable for detecting the first and second reflected light beams FRB and SRB and for generating a detection output indicative thereof. The light detection arrangement 16 can include one or more light sensors for detecting each one or both of the first and second reflected light beams FRB and SRB. In some exemplary embodiments, the one or more light sensors can be based on quad sensor(s). In some exemplary embodiments, the light sensor(s) is/are configured and operable to generate an electrical output signal(s) (the detection output) in response to the light input signal(s). In some exemplary embodiments, the light sensor(s) is/are configured and operable to generate detection output(s) indicative of the detected light intensity. In some exemplary embodiments, the light sensor(s) is/are configured and operable to generate detection output(s) indicative of spatial location(s)/propagation path(s) of the detected light beam(s).

Optionally, the system 10 includes the positioning/localizing utility 20 (illustrated in dashed lines). When provided, the positioning utility 20 is configured and operable to optimize the location of one or more of the light source arrangement 12, the light detection arrangement 16 and/or the light directing arrangement 14, or parts thereof, with respect to the tracked eye EYE. The positioning utility 20 may be totally independent or may utilize the light directing arrangement 14 to support its function. For simplicity of description, the system's components, apart from the positioning utility and the control and processing utility, will be occasionally referred to herein as a "light beam eye scanner".

In some embodiments, the positioning utility 20 is configured as an imaging system configured and operable to provide images of the eye EYE and regions thereof, such as the cornea, pupil and limbus of the eye. In some embodiments, the positioning utility 20 is configured as a stereo imaging system.

In some embodiments, the positioning utility 20 provides data about the distance of one or more components of the system from the eye (along z-axis (horizontal), x-axis (vertical), y-axis (lateral)). Therefore, enabling corrections of positions of the different components and their distance from the eye, along the z-axis, x-axis and/or y-axis, or enabling corrections/adaptations of calculated detection output(s).

In some embodiments, the positioning utility 20 provides data about angular range of gaze direction of the eye. In particular, the positioning utility 20 may be configured to provide a wider angular range of gaze direction than the range provided by the light beam scanner of the system. Therefore, enabling repositioning of the light beam eye scanner to provide more precise eye and gaze tracking in an optimal range.

In some embodiments, the positioning utility 20 is configured as a LiDAR imaging system, optical imaging system or the like.

The positioning utility 20 captures images of one or more features of the eye, such as the pupil and/or limbus, to be utilized by the system (e.g. by the control and processing utility 18) to control the localization of the light beam eye scanner (both angular location, lateral location and distance along z-axis (being a horizontal axis)) with respect to the eye EYE.

In one specific embodiment, the positioning utility 20 is configured as a stereo imaging system for eye tracking such as the system described in WO20157746 assigned to the assignee of the present invention.

In another specific embodiment, for a further enhanced tracking, the positioning utility 20 is configured and operable to provide a plurality of different eye tracking data, for example a first data indicative of a pupil of the eye (a pupil tracker), and a second data indicative of an alternative eye tracking (alternative eye tracker). The first and second data are typically image data. The positioning utility 20 and/or the control and processing utility 18 is/are configured to process the first and second data, e.g. by applying a regression model/algorithm, and correlate between parameters measured with the pupil tracker and parameters measured with the alternative eye tracker. The set of parameters measured and determined may be indicative of gaze direction, parameters of the eye, and/or parts of the eye location. In one example, the alternative eye tracker is a limbus tracker.

The control and processing utility 18 is configured and operable to receive the detection output from the light detection arrangement 16 and determine whether the CSCLR/visual axis and/or the optical axis of the individual's eye EYE is/are being tracked. Further, the control and processing utility 18 is configured and operable to determine the adjustment of the light beams itinerary in order to track the respective ocular axis, inter alia by activating a control function and/or control loop that receives the detection output and generates an output for correcting the light beams itinerary so that the light beams track the ocular axis.

The control and processing utility 18 is also configured and operable to control the operation of the light source arrangement 12 and/or the light directing arrangement 14 and/or the light detection arrangement 16 and/or the positioning utility 20, and the different elements thereof, in order to determine the tracking of the CSCLR/visual axis and/or the optical axis of the individual's eye. Accordingly, the control and processing utility 18 includes one or more controllers configured and operable to control the different parts of the system 10. In some exemplary embodiments, each of the light source arrangement 12 and the light directing arrangement 14, the light detection arrangement 16 and the positioning utility 20 (the system parts/sub-systems) has its own controller(s) configured to control the operation of one or more elements of the respective system part. In some exemplary embodiments, one or more central controllers are configured to control operation of some or all of the system parts including the light source arrangement 12 and the light directing arrangement 14, the light detection arrangement 16 and the positioning utility 20. In case more than one controller are used, the controllers can be located in one location in the system 10 and connected to the corresponding controlled system part, or the controllers can be distributed in the system such that each system part has its own controller(s) located therewith. Even if no controller is specifically described or shown in the figures, this should not limit the broad aspect of the invention, and it is to be understood that each action performed by the control and processing utility to control the operation of any system part is typically performed by one or more controllers corresponding to the respective system part. The controller(s) can be software or hardware based or a combination thereof.

The control and processing utility 18 also includes one or more processors that receive and process the detection output from the light detection arrangement 16 and/or from the optional positioning utility 20 in order to track and determine the CSCLR/visual axis and/or the optical axis.

The CSCLR/visual axis is tracked upon determining of fulfillment of two conditions. The first condition is that the first reflected light beam FRB propagates backwardly from the eye EYE along the first optical path FOP, in other words, FIB and FRB are coaxial and are perpendicular to the cornea surface at the intersection point IP, i.e. the optical path FOP is normal to the cornea surface at the intersection point IP.

The second condition is that the second reflected light beam SRB propagates backwardly from the eye along a second optical path SOP defined by central axis of the second reflected light beam SRB and which is parallel to and having a predetermined spatial offset (vectorial offset) with respect to the first optical path FOP.

It should be noted that all the explanations provided above, with reference to method 100, with respect to the mentioned spatial offset, are true and valid also for the operation and processing of the detected light signals by the system 10.

The optical axis is tracked upon determining of fulfillment of two conditions as well. The first condition is that the first reflected light beam FRB propagates backwardly from the eye EYE along the first optical path FOP. The second condition is that the second reflected light beam SRB propagates backwardly from the eye EYE coaxially to the first reflected light beam FRB such that central axes of FRB and SRB coincide with the first optical path FOP. The optical axis of the eye is the extension of the first optical path FOP through the eye from the cornea to the retina and passes through the center of rotation of the eye EYE which is the center of the sphere of the eye. As appreciated, the optical axis passes through the center of the corneal sphere as well as through the center of the eye sphere and it is a unique single axis for each eye.

Figure 5:
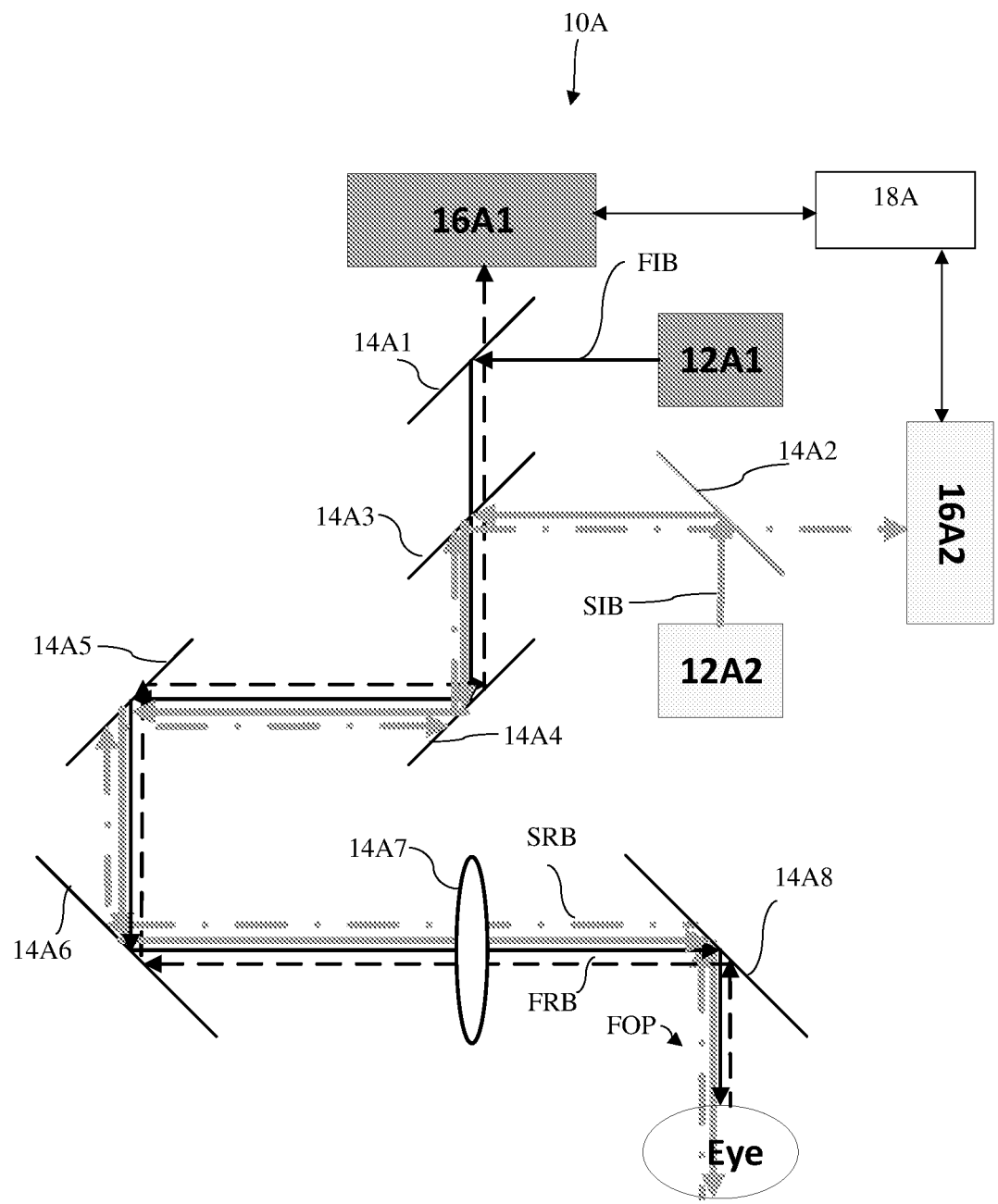
FIG. 5 illustrates a specific non-limiting example of a system for tracking the CSCLR (visual) axis and/or optical axis of the eye, in accordance with the present invention.

Reference is now made to FIG. 5 illustrating a non-limiting example of a system 10A for tracking the CSCLR/visual axis and/or optical axis of the eye, in accordance with the technique of the present invention.

For simplicity of presentation, it is noted that elements in FIG. 5 having similar functionality as in FIG. 4 are referred to with similar reference numbers with added suffix. For example, a light source arrangement is indicated 12A.

As in system 10, the system 10A includes a light source arrangement, a light direction arrangement, a light detection arrangement, and a control and processing utility, configured and operable together to determine the visual axis and/or optical axis of the eye.

The light source arrangement includes light source units 12A1 and 12A2 configured respectively for generating the first and second incident light beams FIB and SIB having the required specifications (wavelength, intensity) as described above, to be respectively reflected back from the cornea surface and from the retina through the pupil and cornea. In this example, it is assumed that FIB has a wavelength $\lambda_1$ and SIB has a wavelength $\lambda_2$. Alternatively, it is possible to separate the corneal and retinal light beams in time, and by this one is not limited to use different wavelengths for the corneal and retinal light beams.

The light directing arrangement includes directing elements 14A1-14A8 configured and operable to direct the incident light beams FIB and SIB from the light source arrangement to the eye while insuring that the light beams are coaxial at least when they reach the eye along the first optical path FOP, and to collect and direct the reflected light beams FRB and SRB from the eye to the light detection arrangement.

FIB passes through a beam splitter 14A1 which divides FIB 50:50 by transmitting 50% and reflecting 50%. SIB also passes through a beam splitter 14A2 which divides FIB 50:50 by transmitting 50% and reflecting 50%. Using the beam splitters in the specific described example is in order to enable reflecting the incident light beams and transmitting the reflected light beams. FIB and SIB then pass a dichroic mirror 14A3 which is configured to separate light spectrally by transmitting and reflecting light as a function of wavelength. In case $\lambda_1 > \lambda_2$ a long-pass dichroic mirror which is highly reflective below $\lambda_1$ (the cutoff wavelength) and highly transmissive above it, is used. In case $\lambda_1 < \lambda_2$ a short-pass dichroic mirror, which is highly reflective above $\lambda_2$ (the cutoff wavelength) and highly transmissive below it, is used. This way, in this specific example, FIB and SIB pass through the dichroic mirror 14A3 towards the eye.

The rest of the elements of the light directing arrangement serve the purpose to bring the incident first and second light beams FIB and SIB towards the eye and to collect the reflected first and second light beams FRB and SRB propagating away from the eye towards the light detection arrangement. FIB and SIB pass through two fast scanning mirrors (FSM) 14A4 and 14A5, each with two rotational degrees of freedom. These FSMs ensure that the beam is aligned with the eye, e.g. along the optical axis of the eye, while the eye performs angular movement (horizontal/vertical) and/or lateral movement (horizontal/vertical). At least one FSM can be used to correct for angular movements while at least two FSMs should be used to correct for lateral movements. Lateral movement can occur due to either: a) changes in the instantaneous position of eye's center of rotation (the center of the sphere of the eye), b) relative movement between the individual's head and the system 10 or 10A. It should be understood that the optical setup may include more than one mirror for correcting the angular movements and more than two mirrors for correcting the lateral movements. Furthermore, the optical setup may include one common mirror, out of the at least two mirrors, that can be used for both angular as well as lateral corrections. In the described example, mirror 14A4 or 14A5 can be used to correct angular movements, and both mirrors 14A4 and 14A5 are used to correct lateral movements.

A mirror 14A8, located just before the eye, can be made to be fully reflective in the spectrum used for FIB and SIB (e.g. Infrared), while being fully transparent (or partly transparent, if projection is considered) in the visual spectrum to allow the individual to see the world in augmented reality experiences.

One or more mirrors, such as mirror 14A6, can be applied, as necessary, to the optical path of the light beams, for example due to constraints regarding the structure of the housing in which the system 10 or 10A is located.

As appreciated, if the incident light beams hit the eye at an angle, which is not perpendicular to the cornea surface, it will be reflected with an angle. Therefore, a lens 14A7 can be used in order to collect the reflected light beam(s) and bring them back to the light detection arrangement. This enables detection of displacement of the incident light beams from being perpendicular to the cornea surface, for example by the fact that the reflected light beams do not arrive at a predetermined location (e.g. a center) on the detectors 16A1 and/or 16A2 of the light detection arrangement. Using the detected displacement, for example, as an input error (into a control loop), will enable to adjust the two FSMs 14A4 and 14A5 until zero deflection is measured on the relevant detector with respect to the location on the detector resembling the perpendicularity condition or the foveal condition for example, thus ensuring the alignment between the detector and the individual's eye.

The light detection arrangement includes detectors 16A1 and 16A2 configured and operable for detecting FRB and SRB respectively.

When returning from the eye, FRB is fully transmitted by the dichroic mirror 14A3 and then only 50% of it reaches detector 16A1 due to the beam splitter 14A1. The dichroic mirror 14A3 is chosen such as to reflect ~100% of the SRB which then also only 50% of it reaches detector 16A2 due to the beam splitter 14A2.

The control and processing utility 18A receives the detected signals from the detectors 16A1 and 16A2, analyzes the detected signals and as necessary applies a control function/loop and adjusts each incident light beam to ensure the satisfaction of the conditions required to determine the CSCLR/visual axis or the optical axis, as described above. It is possible that the two control loops for corneal and retinal beams are operated simultaneously until fulfillment of the conditions, e.g. perpendicularity and the foveal conditions.

While the positioning utility is not illustrated in FIG. 5, it should be totally understood that it can be included and operated as described above with reference to FIG. 4.

Reference is made to FIGS. 6A-6D illustrating one non-limiting example of a control function configured to control the spatial and angular orientation/direction of the first optical path in any one of the methods and systems for tracking the CSCLR/visual axis and/or optical axis. The control function can, for example, be utilized to correct the spatial and/or angular orientation of the first and/or second incident beams (i.e. the first optical path) based on the detection data of the first and/or second reflected beams and/or the detection image data received from the positioning utility 20. The detection data can be used as an input into a control loop of the control function in order to adjust the angular as well as spatial (lateral) direction of the first optical path as well as the distance of the light beam eye scanner from the eye (also denoted herein as itinerary). The control function can be executed by a specific controller or by the control and processing utility 18. In this specific example, the tracked ocular axis is the optical axis, however it should be understood that the described method can be adjusted for tracking any other ocular axis, such as the CSCLR/visual axis, by defining the suitable parameters. In one embodiment, the suitable parameters are defined relative to the parameters of the eye's optical axis.

As mentioned above, once the eye moves angularly or laterally there is a need to correct both the angular and spatial directions of the first optical path in order to satisfy both the corneal (angular) and retinal (spatial) conditions. For example, in the case of tracking the optical axis, it can be appreciated that the intersection point of the light beam on the cornea is a fixed location on the cornea. Therefore, when the eye moves, either angularly or laterally, the fixed location on the cornea moves in space requiring adjusting both of the angular and the spatial directions of the light beams.

According to the invention, the angular detection data is obtained from a first sensor, the sensor that detects the first reflected beam, while the lateral detection data is obtained from a second sensor, the sensor that detects the second reflected beam. Adjusting both of the angular and spatial directions each time the eye moves is a demanding task. Accordingly, as will be further described below, the control function ensures that the adjustment is as effective and efficient as possible, by utilizing preliminary data correlating between a range of FSMs orientations (angles) and angular and spatial displacements of the light beams.

FIG. 6A exemplifies the control function/loop used in tracking of the subject's eye, by managing the adjustment of the properties (angle of incidence and intersection point with respect to the cornea surface, sometimes denoted Attitude in the following description) of the first and second light beams used in the technique of the present invention.

As shown, the control function is executed by the system of the invention that includes the utilities of the light direction arrangement 14 that includes the FSMs 14C responsible for defining the itinerary of the FIB and SIB, the light detection arrangement 16 that detects the FRB and SRB, and the control and processing utility 18 that includes a utility/controller 18C responsible for executing the control function. When the system also includes the positioning utility 20, an additional input data regarding the distance z (along the z-axis) of the light beam eye scanner (or any part thereof) from the eye is fed into the controller 18C.

By using the following definitions, with respect to a reference coordinate system:

$\theta, \phi$—horizontal and vertical angles of the light beams and Eye's optical axis;

x, y—horizontal and vertical positions of the light beams and Eye's optical axis;

then it is possible to define the following vectors:

$$\underline{\Phi} \triangleq [\theta \phi x y]^T$$

—light beam and Eye's Optical Axis angles and positions;
$\underline{\Phi}_L$—vector of the FIB and SIB directed by the FSMs 14C towards the eye;
$\underline{\Phi}_E$—vector of the optical axis of the eye;
In case the optical axis of the eye is the ocular axis tracked, a tracking error can be defined as follows:
$\Delta\underline{\Phi} = \underline{\Phi}_L - \underline{\Phi}_E$;
The angles of the first and second axes of the FSMs can be defined in a vector as follows:

$$\underline{\beta} \triangleq [\beta_{Fx}\beta_{Fy}\beta_{Sx}\beta_{Sy}]^T;$$

And, if the detected signals from the detectors 16 is defined as:

$$\underline{q} \triangleq [S1_x S1_y S2_x S2_y]^T$$

—Feedback sensor signals, where
S1—denotes FRB, and
S2—denotes SRB;
The reflected beams from the corneal (FRB) and the retinal (SRB) surfaces arrive at the respective detectors 16 with displacements which depend on the FSMs angular positions and eye's angular and lateral positions. The signals from the detectors 16 serve as feedback signals q to the control loop. The controller 18C extracts the tracking error from the feedback signals and applies a control algorithm. The controller's output are the FSMs angles that set the required light beam (FIB and SIB) vector $\underline{\Phi}_L$ that reduces the tracking error continually.

The target is that the tracking error should go down to zero, i.e. $\Delta\underline{\Phi} = \underline{\Phi}_L - \underline{\Phi}_E = [0\ 0\ 0\ 0]$; this is done as follows:

As the vector q is fed into the controller by the detectors, the controller calculates the error in terms of angles and spatial positions, for example by comparing the detected signal q to the detection signal that is obtained when the tracking error is zero, where the latter can be known to the controller during a calibration stage. The controller calculates from the tracking error a new vector $\underline{\Phi}_R$ of angles and positions that continually reduces the tracking error. In the last step, the controller translates the required angles and positions vector $\underline{\Phi}_R$ into FSMs angles defined as vector β. Since the vector $\underline{\Phi}_L$ of the FIB and SIB is known to the controller 18C, the controller can then obtain the vector of the eye's optical axis $\underline{\Phi}_E$ and generate the required vector β to control the FSMs and minimize the tracking error down to zero.

Figure 1:
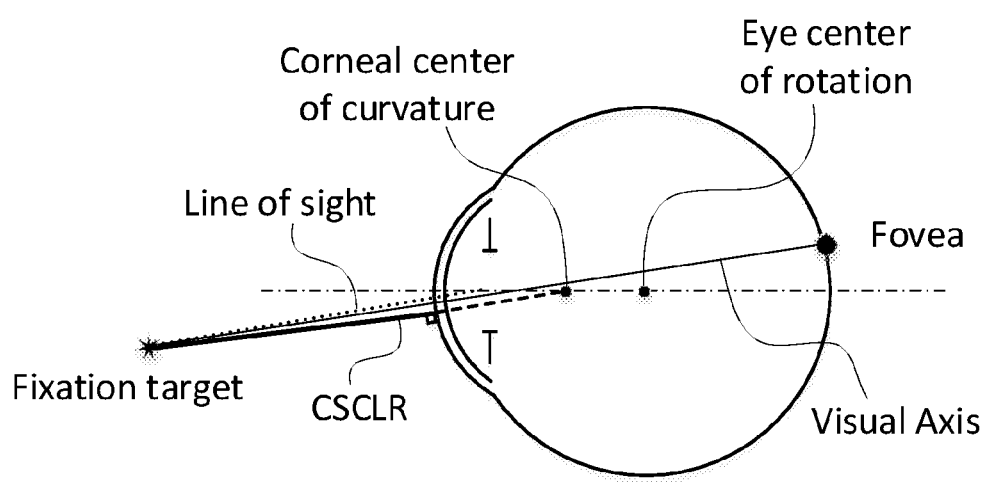
FIG. 1 illustrates an eye with paths of various ocular axes.

FIG. 6B1 illustrates in more detail the components of the controller 18C. As shown, the controller includes three components:

1. Sensor processing—A Measurement Matrix is defined as a relation between the tracking error $\Delta\underline{\Phi}$ and the feedback sensors' signal q. The measurement matrix is measured once typically, during a calibration stage, by for example placing an artificial eye in front of the system, changing the incident angles and positions of FIB and SIB (β) in a pre-determined grid of values and recording the response of the detectors (q). In order to obtain the tracking error, the feedback sensors' signals are multiplied by the Measurement Matrix Inverse.

2. Control algorithm—c represents the control algorithm. The control algorithm takes the tracking error $\Delta\underline{\Phi}$ as an input and continually calculates the required light beam angles and positions ($\underline{\Phi}_R$) in order to keep $\Delta\underline{\Phi}$ as small as possible. Since the tracking error is a vector of four components, two angular ($\Delta\theta$, $\Delta\phi$) and two lateral ($\Delta x$, $\Delta y$) error vector components, there are four separate components of the control algorithm, one for each error vector component.

3. Converting function—is responsible to convert $\underline{\Phi}_R$ into the respective vector of FSMs angles β, which in case of electrostatically actuated FSMs, for example, consists of voltages needed to be supplied to the FSMs to affect the required $\underline{\Phi}_R$.

FIG. 6B1 illustrates the controller's components when the light beam eye scanner is located at the nominal distance from the eye EYE. However, if the distance between the light beam eye scanner and the eye EYE changes during the tracking process, there is a need to apply a correction of the controller's output due to the distance change. This is illustrated in FIG. 6B2. The distance data is provided by the positioning utility 20.

In one specific embodiment, when the positioning utility 20 is configured as the stereo imaging system for detecting the limbus, as mentioned above, the distance data is extracted from the z-coordinate of the center of Limbus and then translated to the coordinates of the light beam eye scanner.

In case the positioning utility 20 provides the output indicative of the deviation from the nominal distance continuously, this can be used in order to correct the controller outputs. As shown in the figure, z-correction block is added into the Converting Algorithm block. The updated block receives as inputs the original controller outputs, the instantaneous distance ($z_R$) and computes the corrected controller output that takes into account the deviation from the nominal distance.

Figure 6C:
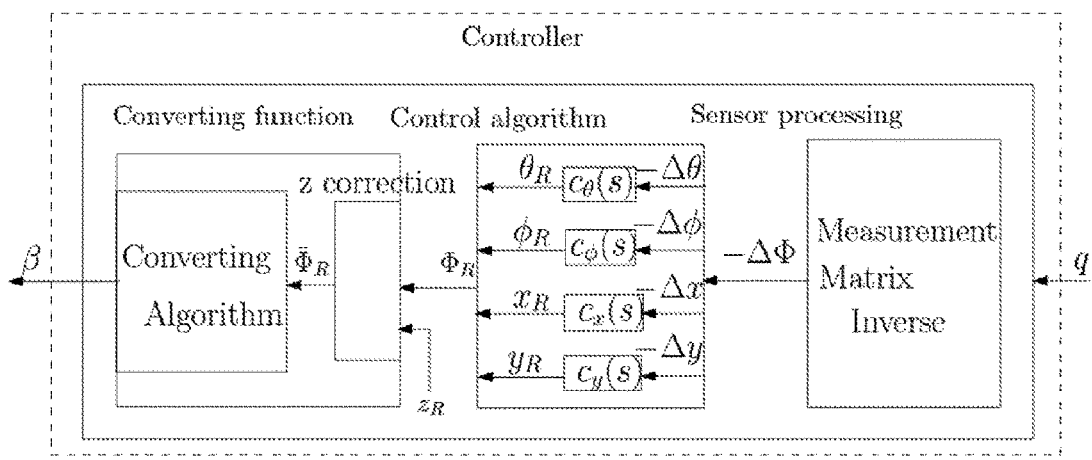
Figure 6C:
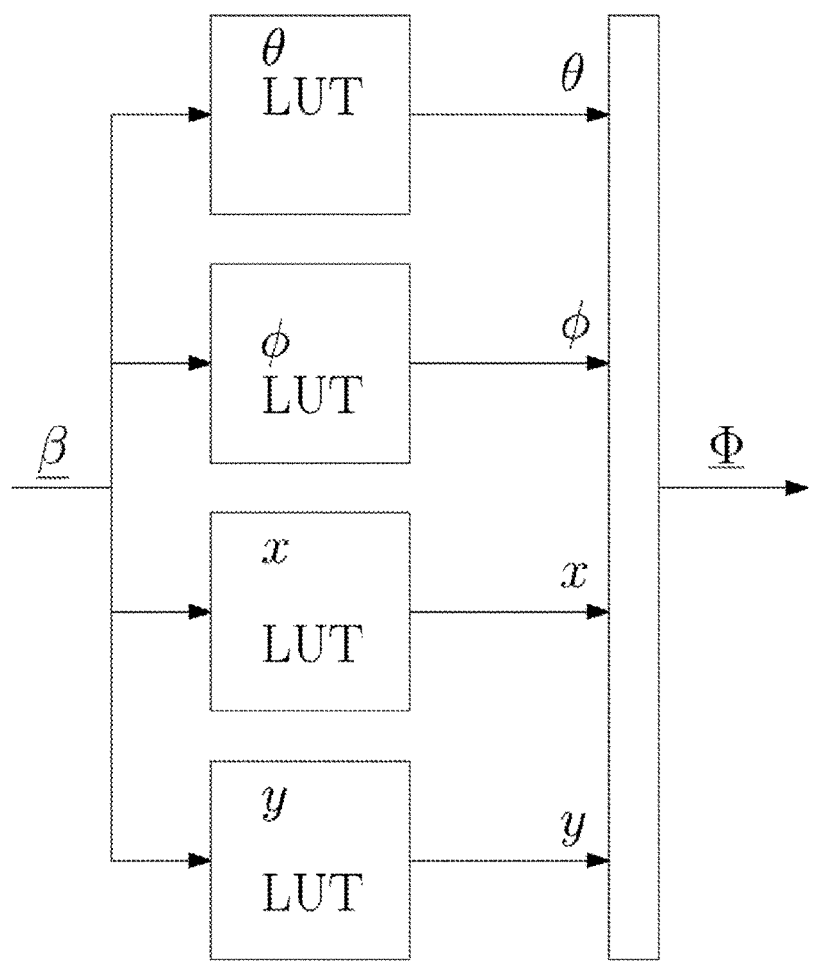

The converting function uses the converting algorithm to provide the transformation from $\Phi_R$ (or $\overline{\Phi}_R$) to β. The converting algorithm is based on a transformation of a pre-determined direct look-up table (LUT) that is shown in FIG. 6C. The direct LUT is obtained during a preliminary step of system calibration where angles and positions of FIB and SIB are measured at a pre-determined range of β vectors. The various angles and positions of FIB and SIB can be measured by known in the art techniques, e.g., two position dependent detectors arranged in a specially designed optical setup allowing a precise simultaneous measurement of light beam angle and lateral position in two dimensions. An example of the LUT is the parametric space of all paths perpendicular to the cornea, across a predetermined cornea area, as was described above.

The mapping process can be as follows:
For each FSM angle (β component) define a vector of equal-distance values according to the required range and resolution:
$\beta_{Fx} = \{\beta_{Fx_1}\beta_{Fx_2} \ldots \beta_{Fx_{N1}}\}$
$\beta_{Fy} = \{\beta_{Fy_1}\beta_{Fy_2} \ldots \beta_{Fx_{N2}}\}$
$\beta_{Sx} = \{\beta_{Sx_1}\beta_{Sx_2} \ldots \beta_{Sx_{N3}}\}$
$\beta_{Sy} = \{\beta_{Sy_1}\beta_{Sy2} \ldots \beta_{Sy_{N4}}\}$
Run a routine that applies in sequence all the possible combinations of FSM angles (four nested loops, total number of combinations: $N_1 \times N_2 \times N_3 \times N_4$).

After setting each one of the combinations of the FSM angles, $\underline{\beta}$, wait to allow settling of the FSM motion, and read the beam angles ($\theta,\phi$) and positions (x,y)—components of the vector ($\underline{\Phi}$).

Sort the measured values of the output $\underline{\Phi}$ in four dimensional arrays as follows: (take $\theta$ as an example): $\theta$(i, j, k, l) is the measured $\theta$ when $\underline{\beta}=[\beta_{Fx_i}\beta_{Fy_j}\beta_{Sx_k}\beta_{Sy_l}]$.

Use the obtained arrays, together with the predefined input $\underline{\beta}$ vectors, to define four Look Up Tables (LUTs) structure.

Each of the LUTs defines transformation between the four FSM angles and one of the light beam's $\underline{\Phi}$ components.

The entire four LUTs define full transformation between $\underline{\beta}$ and $\underline{\Phi}$.

This transformation is denoted as Direct Transformation.

Figure 6D:
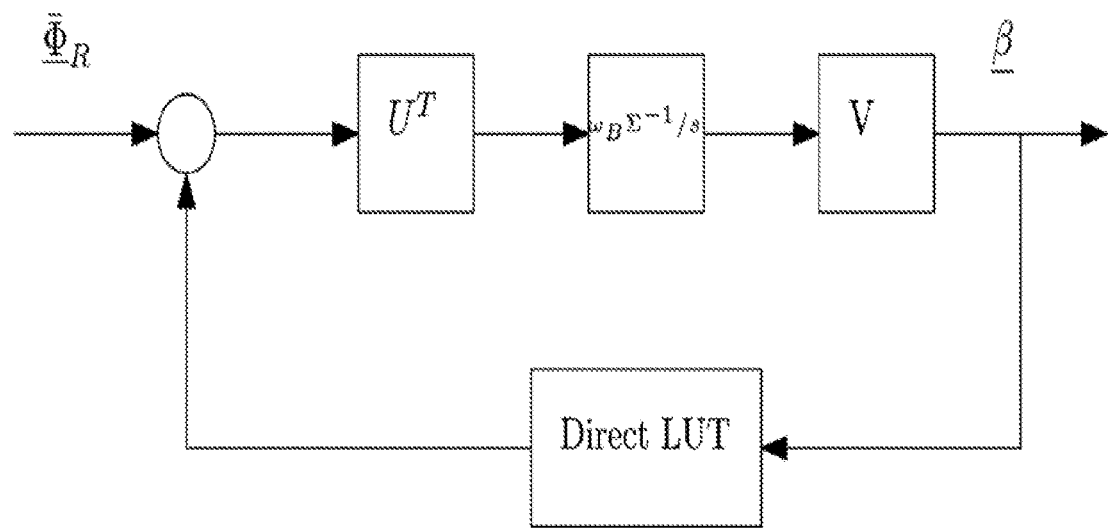

The converting function requires the inverse transformation, i.e., from $\underline{\Phi}$ to $\underline{\beta}$. In order to extract the inverse transformation an algorithm described schematically by the Block Diagram of FIG. 6D is applied.

The Direct LUT is a non-linear 4×4 Multi Inputs Multi Outputs (MIMO) transformation. In order to decouple between the inputs and outputs of this transformation the following procedure is applied:

1. Approximate the Direct LUT by a linear transformation, i.e., a matrix.
2. Apply SVD on this matrix.

T is the linear approximation matrix of Direct LUT Transformation. T matrix is calculated numerically, by averaging the input-output relations for a set of inputs that cover the entire angular ranges of the FSMs. U, V and $\Sigma$ are the Singular Value Decomposition (SVD) matrices of T fulfilling the following condition:

$$T=V^T\Sigma U$$

Where V and U are Unitary ($V^{-1}=V^T$, and $U^{-1}=U^T$) and $\Sigma$ is a diagonal matrix (with the singular values on the diagonal).

The implementation of the control function/loop that inverts the Direct LUT transformation where $\omega_B$ is the loop bandwidth and s is Laplace variable is illustrated in the figure.

By placing a function or transformation in the feedback path of a high gain closed loop, an inverse function is generated between the reference signal of the closed loop ($\underline{\Phi}_R$ or $\overline{\Phi}_R$) and the output of the closed loop ($\underline{\beta}$). This approach, compared to optimization based method, is much faster and does not require an iterative process. The described implementation of the controller block simplifies the control function/loop, and enables to achieve better closed loop performances and more robust control.

Accordingly, in some embodiments, the invention provides a highly effective control function that enables defining the positioning of the light directing arrangement to track a given ocular axis, by utilizing a priori data in the form of a parametric space defining relations between a range of positions of the light directing arrangement and the resulting light beams itineraries, and then using the detected light beams itineraries and the a priori data to calculate the required positions of the light directing arrangement to achieve the light beams itineraries required for tracking a given ocular axis of the eye.

The invention claimed is:

1. A method for tracking an ocular axis of an individual's eye, the method comprising:
    (i) illuminating an eye of an individual, over an area of cornea of the eye extending over pupil of the eye, with first and second incident light beams having a transverse cross sectional area smaller than an area of the pupil and propagating towards the eye coaxially along a first optical path defined by central axes of the first and second incident light beams, said first and second incident light beams differing from one another in at least one of optical properties and timing parameters, thereby enabling to identify first and second reflected light beams comprising reflections of said first and second incident light beams propagating backwardly from the cornea and a retina region of the eye;
    (ii) detecting said first and second reflected light beams and generating a detection output indicative thereof, said detection output being indicative of changes in spatial and angular propagation paths of the first and second reflected light beams, said changes being indicative of a change in at least one of spatial and angular positions of said ocular axis
    (iii) adjusting the first optical path such that said first reflected light beam propagates backwardly from the eye along said first optical path and said second reflected light beam propagates backwardly from the eye along a second optical path having a predetermined spatial relationship with said first optical path whereby said predetermined spatial relationship is indicative of said ocular axis being along at least said first optical path; and
    (iv) tracking said ocular axis of the eye under changes in gaze direction of said eye by repeating (i) to (iii).

2. The method according to claim 1, characterized by one of the following: adapted for tracking a coaxially sighted corneal light reflex (CSCLR) axis of the eye, wherein said predetermined spatial relationship comprises said second optical path being parallel to and having a fixed spatial offset with respect to said first optical path; and adapted for tracking an optical axis of the eye, wherein said predetermined spatial relationship comprises said second optical path being coaxial with said first optical path such that central axes of the first and second reflected light beams coincide, the optical axis being an extension of said first optical path through the eye from the cornea to the retina.

3. The method according to claim 1, comprising: tracking a coaxially sighted corneal light reflex (CSCLR) axis of the eye, said predetermined spatial relationship comprising said second optical path being parallel to and having a fixed spatial offset with respect to said first optical path; and carrying out a calibration stage for determining a value of said fixed spatial offset, wherein said calibration stage comprising determining said fixed spatial offset as an offset between said first and second optical paths, by carrying out the following under calibration conditions in which a gaze of the individual's eye is fixated on an object: carrying out steps (i) and (ii) with said first optical path, or an extension thereof, extending linearly and directly between said object and the eye of the individual.

4. The method according to claim 1, wherein said first optical path is determined by illuminating the cornea with an incident light beam propagating along a first direction, detecting a reflected light beam being reflected from the cornea along a second direction, and determining the first optical path by adjusting said first or second direction until central axes of said incident light beam and reflected light beam coincide.

5. The method according to claim 1, characterized by at least one of the following: each of said first and second incident light beams has a wavelength in an unseen range; and each of said first and second incident light beams has a wavelength between 800 nm-1500 nm.

6. The method according to claim 1, wherein said step of adjusting the first optical path comprises at least of the following:
performing at least one of horizontal, lateral and vertical adjustments of the first optical path with respect to the individual's eye; and
applying a control function that calculates a correction signal, for use in said step of illuminating the eye of the individual, based on one or more of the following: said step of detection of the first and second reflected light beams, and said step of providing the position data.

7. The method according to claim 1, further comprising providing position data indicative of at least one of the following: horizontal distance between said first optical path and the individual's eye; lateral distance between said first optical path and the individual's eye; vertical distance between said first optical path and the individual's eye; angular range of gaze direction of the individual's eye; and utilizing the position data in said step of adjusting the first optical path.

8. The method according to claim 7, wherein said position data comprises image data of one or more of the following eye features: pupil, limbus, cornea and iris of the individual's eye.

9. The method according to claim 8, wherein said image data comprises stereo images of one or more of the eye features.

10. The method according to claim 1, wherein said step of adjusting the first optical path comprises applying a control function that calculates a correction signal, for use in said step of illuminating the eye of the individual, based on one or more of the following: said step of detection of the first and second reflected light beams, and said step of providing the position data, said correction signal being calculated by utilizing a predetermined parametric space relating between a plurality of positions of light directing elements configured and operable to direct said first and second incident light beams and a corresponding plurality of said first optical path.

11. A system for tracking an ocular axis of an individual's eye, the system comprising:
a light source arrangement configured and operable to generate first and second incident light beams having a transverse cross sectional area smaller than an area of the pupil, said first and second incident light beams differing from one another in at least one of optical properties and timing parameters, thereby enabling to identify first and second reflected light beams comprising reflections of said first and second incident light beams propagating backwardly from a cornea of an eye of the individual and a retinal region of the eye;
a light directing arrangement configured and operable to:
direct said first and second incident light beams from said light source arrangement coaxially towards the eye of the individual along a first optical path defined by central axes of the first and second incident light beams to thereby illuminate the eye over an area of the cornea extending over pupil of the eye and to adjust said first optical path under changes in gaze direction of said eye, and
collect respective first and second reflected light beams propagating backwardly from the eye;
a light detection arrangement, located at an output of said light directing arrangement, and configured and operable for detecting said first and second reflected light beams and generating a detection output indicative thereof, said detection output being indicative of changes in spatial and angular propagation paths of the first and second reflected light beams, said changes being indicative of a change in at least one of spatial and angular position of said ocular axis; and
a control and processing utility being configured and operable to receive said detection output of said light detection arrangement and determine that the ocular axis of the individual is being tracked upon detecting that:
said first reflected light beam propagates along said first optical path, and
said second reflected light beam propagates along a second optical path defined by central axis of the second reflected light beam and having a predetermined spatial relationship with respect to said first optical path, whereby said predetermined spatial relationship is indicative of said ocular axis being along at least said first optical path.

12. The system according to claim 11, configured and operable to carry out one of the following: tracking a coaxially sighted corneal light reflex (CSCLR) axis of the eye, wherein said predetermined spatial relationship comprises said second optical path being parallel to and having a fixed spatial offset with respect to said first optical path; and tracking an optical axis of the eye, wherein said predetermined spatial relationship comprises said second optical path being coaxial with said first optical path such that central axes of the first and second reflected light beams coincide, the optical axis being an extension of said first optical path through the eye from the cornea to the retina.

13. The system according to claim 12, configured and operable to carry out the following: tracking a coaxially sighted corneal light reflex (CSCLR) axis of the eye, wherein said predetermined spatial relationship comprises said second optical path being parallel to and having a fixed spatial offset with respect to said first optical path; and carrying out a calibration stage for determining a value of said fixed spatial offset, wherein said calibration stage comprising determining said fixed spatial offset as an offset between said first and second optical paths under calibration conditions in which a gaze of the individual's eye is fixated on an object such that said first optical path, or an extension thereof, extends linearly and directly between said object and the eye of the individual.

14. The system according to claim 11, wherein said light source arrangement is configured and operable to carry out at least one of the following: generate said first and second incident light beams each having a wavelength in an unseen range; and generate said first and second incident light beams each having a wavelength between 800-1500 nm.

15. The system according to claim 11, wherein one or more of said light source arrangement, light directing arrangement and light detection arrangement, or portions thereof, is (are) spatially displaceable in at least two dimensions, with respect to the individual's eye.

16. The system according to claim 11, further comprising a positioning utility configured and operable to provide position data indicative of at least one of the following: horizontal distance between one or more of said light source arrangement, light directing arrangement and light detection arrangement, or portions thereof, and the individual's eye; lateral distance between one or more of said arrangements and the individual's eye; vertical distance between one or more of said arrangements and the individual's eye; angular range of gaze directions of said individual's eye, thereby enabling optimizing location of one or more of said arrangements with respect to the individual's eye to enable tracking said ocular axis.

17. The system according to claim 16, wherein said positioning utility is configured as an imaging system configured and operable to provide image data of the individual's eye being indicative of said position data.

18. The system according to claim 17, wherein said positioning utility is configured as a stereo imaging system configured and operable to provide said image data of the individual's eye as a stereo image data being indicative of said position data.

19. The system according to claim 17, wherein said image data is indicative of one or more of the following features of the individual's eye: pupil, limbus, cornea and iris.

20. The system according to claim 11, wherein said control and processing utility is configured and operable to utilize said detection output and, upon detecting that said ocular axis is not being tracked, calculate a correction signal to said light directing arrangement to adjust said first optical path.

21. The system according to claim 16, wherein said control and processing utility is configured and operable to utilize said detection output and said position data and, upon detecting that said ocular axis is not being tracked, calculate a correction signal to one or more of said light source arrangement, light directing arrangement and light detection arrangement, to adjust said first optical path.

22. The system according to claim 20, wherein said control and processing utility calculates the correction signal by utilizing a predetermined parametric space relating between a plurality of positions of one or more of said light source arrangement, light directing arrangement and light detection arrangement, and a corresponding plurality of said first optical path.

* * * * *